United States Patent
Simonsohn et al.

(10) Patent No.: US 12,370,739 B2
(45) Date of Patent: Jul. 29, 2025

(54) METHOD OF INSTALLING A HEAT SHRINK COVER, INSTALLATION KIT, AND INSTALLATION SYSTEM

(71) Applicant: Tyco Electronics Raychem GmbH, Ottobrunn (DE)

(72) Inventors: Thilo Simonsohn, Munich (DE); Christian Heindl, Munich (DE)

(73) Assignee: TYCO ELECTRONICS RAYCHEM GMBH, Ottobrunn (DE)

( * ) Notice: Subject to any disclaimer, the term of this patent is extended or adjusted under 35 U.S.C. 154(b) by 772 days.

(21) Appl. No.: 17/198,453

(22) Filed: Mar. 11, 2021

(65) Prior Publication Data

US 2021/0197442 A1    Jul. 1, 2021

Related U.S. Application Data

(63) Continuation of application No. PCT/EP2019/074002, filed on Sep. 9, 2019.

(30) Foreign Application Priority Data

Sep. 12, 2018  (EP) ...................... 18193999

(51) Int. Cl.
| | |
|---|---|
| *B29C 61/06* | (2006.01) |
| *B23P 11/02* | (2006.01) |
| *B29C 61/00* | (2006.01) |
| *B29C 61/02* | (2006.01) |

(Continued)

(52) U.S. Cl.
CPC ........ *B29C 61/0616* (2013.01); *B23P 11/025* (2013.01); *B29C 61/003* (2013.01); *B29C 61/02* (2013.01); *B29C 63/0004* (2013.01); *B29C 63/40* (2013.01)

(58) Field of Classification Search
CPC . F24H 1/182; H02G 15/1806; B29C 63/0069; B29C 61/025
See application file for complete search history.

(56) References Cited

U.S. PATENT DOCUMENTS

| | | | |
|---|---|---|---|
| 2,027,962 | A | 1/1936 | Currie |
| 3,086,242 | A | 4/1963 | Cook et al. |

(Continued)

FOREIGN PATENT DOCUMENTS

| | | |
|---|---|---|
| CN | 203787147 U | 8/2014 |
| CN | 104040240 A1 | 9/2014 |

(Continued)

OTHER PUBLICATIONS

Chinese Office Action and English Translation, Application No. 201980059077.7, Dated: Dec. 14, 2021, 31 pages.

(Continued)

*Primary Examiner* — Christopher T Schatz

(57) ABSTRACT

A method of installing a heat shrink cover around a component includes providing the heat shrink cover having an inner sleeve and an outer sleeve, the inner sleeve is a heat shrink sleeve, and attaching an electrical heating system to an outer surface of the outer sleeve. The inner sleeve and the outer sleeve are arranged around the component, with the outer sleeve at least partially encompassing the inner sleeve. The electrical heating system is energized to heat-recover the inner sleeve.

20 Claims, 16 Drawing Sheets

(51) Int. Cl.
    *B29C 63/00*    (2006.01)
    *B29C 63/40*    (2006.01)

(56) References Cited

U.S. PATENT DOCUMENTS

| | | | | |
|---|---|---|---|---|
| 3,691,505 | A * | 9/1972 | Graves | H02G 15/1806 |
| | | | | 219/541 |
| 4,252,849 | A | 2/1981 | Nishimura et al. | |
| 4,487,994 | A | 12/1984 | Bahder | |
| 10,107,438 | B2 | 10/2018 | Tailor et al. | |
| 2007/0128925 | A1* | 6/2007 | Graeve | H02G 15/1806 |
| | | | | 439/523 |
| 2012/0196059 | A1* | 8/2012 | Fujimori | F16L 59/065 |
| | | | | 428/34.1 |
| 2015/0219264 | A1* | 8/2015 | Tailor | B32B 37/142 |
| | | | | 392/433 |

FOREIGN PATENT DOCUMENTS

| | | |
|---|---|---|
| CN | 206272155 U | 6/2017 |
| CN | 107561657 A1 | 1/2018 |
| DE | 2848231 | 5/1979 |
| DE | 102012223650 A1 | 6/2014 |
| EP | 0328326 A1 | 2/1989 |
| WO | 2013067631 A1 | 5/2013 |

OTHER PUBLICATIONS

European Patent Office Examination, dated Dec. 21, 2020, 7 pages.

* cited by examiner

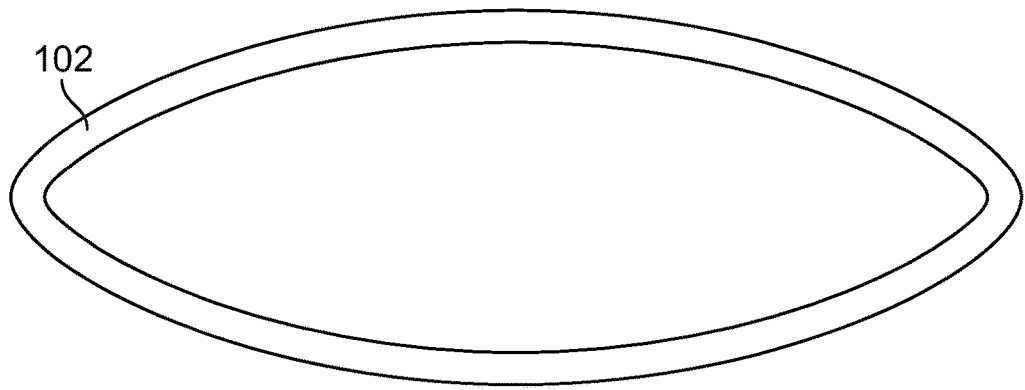
Fig. 19
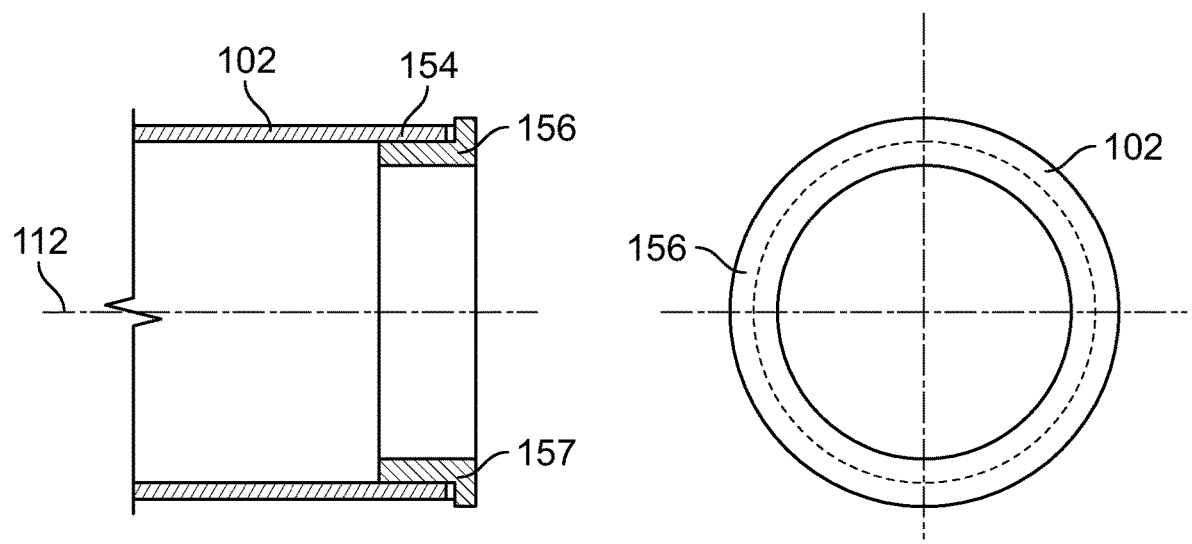
Fig. 20
Fig. 21

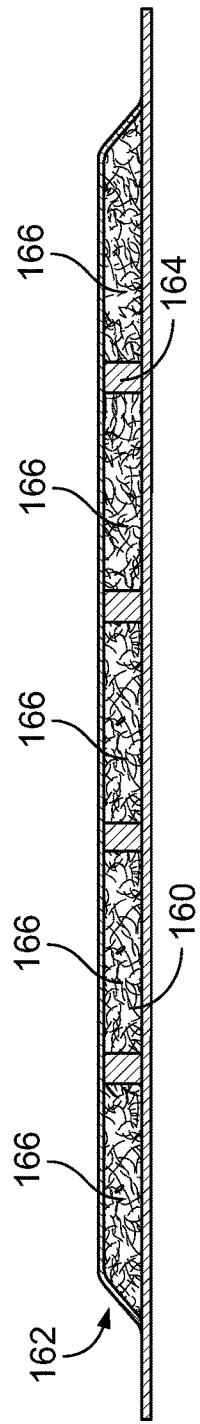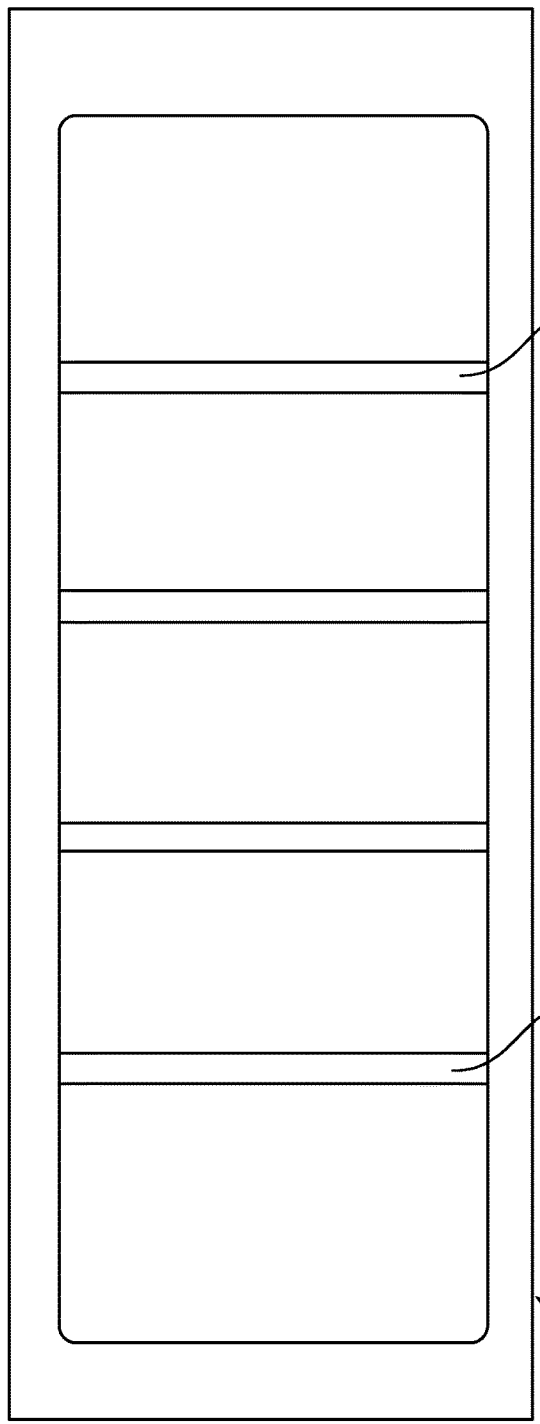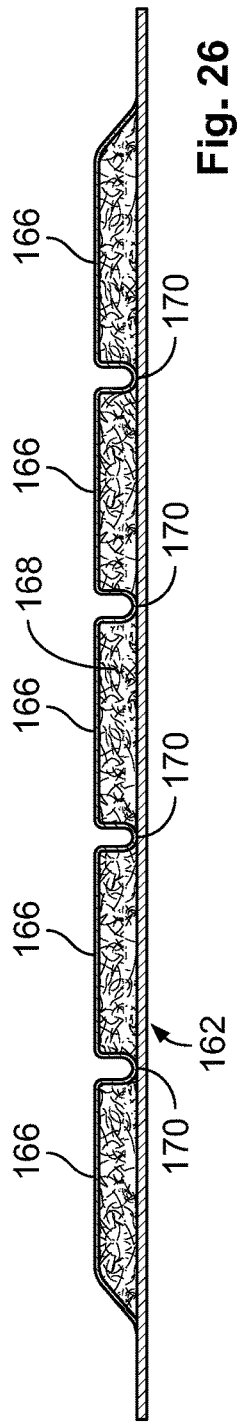

METHOD OF INSTALLING A HEAT SHRINK COVER, INSTALLATION KIT, AND INSTALLATION SYSTEM

CROSS-REFERENCE TO RELATED APPLICATIONS

This application is a continuation of PCT International Application No. PCT/EP2019/074002, filed on Sep. 9, 2019, which claims priority under 35 U.S.C. § 119 to European Patent Application No. 18193999.2, filed on Sep. 12, 2018.

FIELD OF THE INVENTION

The present invention relates to a heat shrink cover and, more particularly, to method of installing a heat shrink cover around a component.

BACKGROUND

Heat shrink components relate to articles that are made from material which shrinks from an expanded state into a shrunk state with a much smaller diameter by applying a sufficient amount of heat. Heat shrink components are widely spread as joint sleeves or other cable accessories. The majority of existing medium voltage joints have heat shrink joint bodies together with mastics, stress control sleeves, or patches underneath. On the outside of the heat shrink bodies, conductive meshes are taped, and the shield wires or tape shields of the cables are connected from one end of the joint to the other. Finally, the entire connection area is usually covered by a heat shrink outer protection sleeve, the so-called rejacketing sleeve.

A heat-recoverable article, an independently dimensionally heat-unstable article, is made of a material capable of having the property of elastic or plastic memory imparted thereto which is heated to a certain temperature and distorted e. g. under internal pressure to a configuration different from its normal configuration and then cooled while kept under pressure. If the article is made of a material which is wholly or partly crystalline, is at least partly cross-linked in the amorphous areas, and is distorted at a temperature at or above the crystalline melting point of the material, the article will have elastic memory. An article with elastic memory will not recover towards its original configuration until it is again heated at least to its crystalline melting temperature. If the article is made of a non-crystalline material, it is heated to a temperature at which the article can be distorted by pressure, and the distorted article then has the property of plastic memory. Examples of heat-recoverable materials are found in U.S. Pat. Nos. 2,027,962 and 3,086,242.

In order to install heat shrink products, typically open flames, such as gas torches, are used. However, the use of open flames can be unsafe. Furthermore, it is desired to reduce the amount of energy needed for installing products. In some cases it is also desired to reduce the amount of heat generated during installation. Consequently, it is desirable to use other energy sources than open flames. In particular, it is desirable that the joint body and the rejacketing sleeve can be installed torchlessly in one process without further interaction of a cable jointer.

SUMMARY

A method of installing a heat shrink cover around a component includes providing the heat shrink cover having an inner sleeve and an outer sleeve, the inner sleeve is a heat shrink sleeve, and attaching an electrical heating system to an outer surface of the outer sleeve. The inner sleeve and the outer sleeve are arranged around the component, with the outer sleeve at least partially encompassing the inner sleeve. The electrical heating system is energized to heat-recover the inner sleeve.

BRIEF DESCRIPTION OF THE DRAWINGS

The invention will now be described by way of example with reference to the accompanying Figures, of which:

FIG. 19 schematically shows a cross-section of a heat shrink sleeve after production and storage;

FIG. 20 schematically illustrates a side view of a heat shrink sleeve with a re-enforcement ring;

FIG. 21 shows a cross-sectional view of the arrangement shown in FIG. 20;

FIG. 24 shows a schematic cross-sectional view of a thermal insulation element according to a first embodiment of the present invention;

FIG. 25 shows a schematic top view of the thermal insulation element of FIG. 24;

FIG. 26 shows a schematic cross-sectional view of a thermal insulation element according to a further embodiment of the present invention;

DETAILED DESCRIPTION OF THE EMBODIMENT(S)

Figure 1:
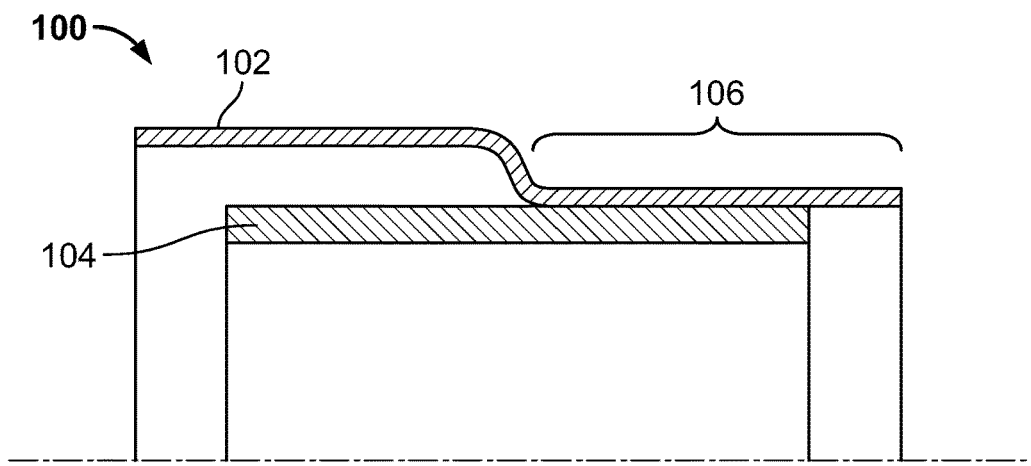
FIG. 1 is a schematic representation of an inner and an outer heat shrink sleeve according to a first arrangement.

The accompanying drawings are incorporated into the specification and form a part of the specification to illustrate several embodiments of the present invention. These drawings, together with the description, serve to explain the principles of the invention. The drawings are merely for the purpose of illustrating embodiments of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Further features and advantages will become apparent from the following more particular description of the various embodiments of the invention, as illustrated in the accompanying drawings, in which like references refer to like elements.

The heat shrink cover described in detail below which is installed according to the present invention, is intended to be used with voltages above approximately 1 kV. In particular, the term high-voltage in the context of the present invention is intended to comprise the usual nominal voltage ranges of power transmission, namely medium voltage, MV, (about 3 kV to about 72 kV), high-voltage, HV, (about 72 kV to about 245 kV), and also extra high-voltage (up to presently about 500 kV). Of course, also higher voltages may be considered in the future. These voltages may be direct current (DC) or alternating current (AC) voltages. In the following, the term "high-voltage cable" is intended to signify a cable that is suitable for carrying electric current of more than about 1 A at a voltage above approximately 1 kV. Accordingly, the term "high-voltage accessory" is intended to signify a device that is suitable for interconnecting high-voltage facilities and/or high-voltage cables. In particular, a high-voltage accessory may either be an end termination or a cable joint.

The present invention is also applicable to the so-called "low-voltage", LV, range that relates to voltages below 1 kV. The principles of the present invention may further be applied to heat shrink products used for electronic applications, piping and construction applications and further more.

The expression "sleeve" according to the present invention is intended to signify straight tube shaped sleeves as well as differently shaped covers for branch joints, elbows, bends, breakouts, wrap-arounds, sheds, and the like. Moreover, the term "heat shrink sleeve" is intended to comprise such a product which has at least one heat shrink layer, so that the heat shrink sleeve is heat-recoverable. In other words, a heat shrink sleeve according to the present invention may be partly or completely formed from a heat-recoverable material. Of course, the heat shrink layer can be fabricated from any suitable material, as this is known to a person skilled in the art. Moreover, also multilayer arrangements that additionally comprise elastic and/or electrically semi-conductive and conductive layers are encompassed by the present invention.

The present invention relates to installation concepts for installing an electrically insulating cover over an object such as a MV joint. The present invention is usable for installing MV joint bodies for 12 to 42 kV, but may also be advantageous for covering other components and be used in other voltage classes. In particular, the present invention may be employed for installing heat shrink joint bodies and rejacketing sleeves as well as in principle all kinds of heat shrink sleeves such as terminations and cover sleeves as well as molded products like sheds, breakouts, boots and caps. The present invention further relates to an installation kit and an installation system for installing a heat shrink cover torchlessly.

FIG. 1 shows a cover 100 which comprises an outer sleeve 102 and an inner sleeve 104. The present invention as will be set forth in the following relates to the installation of at least two sleeves, wherein the inner sleeve 104 is a heat shrink sleeve having at least one heat-recoverable layer, by heating the outer sleeve 102 from its outside. A special application is the heat shrink installation of MV joints with electrical heating systems.

According to an embodiment, the outer sleeve 102 is a rejacketing sleeve and the inner sleeve 104 is a joint body, both sleeves 102, 104 being separate items and being fabricated with at least one heat shrink layer. Both sleeves 102, 104 are positioned independently from each other in a cable jointing area. According to the present invention, both sleeves 102, 104 are installed in one installation sequence, in other words in one heating sequence, without the interaction of a joint to. At the end of the installation process, the electric heaters and all other items needed for the installation process can be removed. The outer sleeve 102 is another heat shrink sleeve in an embodiment, but may also be an elastomeric cold shrink sleeve, or a plastic or a metallic film/sleeve/mesh/net, etc.

For the delivery to the customer, the outer sleeve 102 and the inner sleeve 104 may at least partly be connected to each other as shown in FIG. 1. As shown in this Figure, the outer sleeve 102 has a pre-shrunk region 106 where the diameter of the outer sleeve 102 is reduced, so that the outer sleeve 102 is in thermal contact with the inner sleeve 104.

Figure 2:
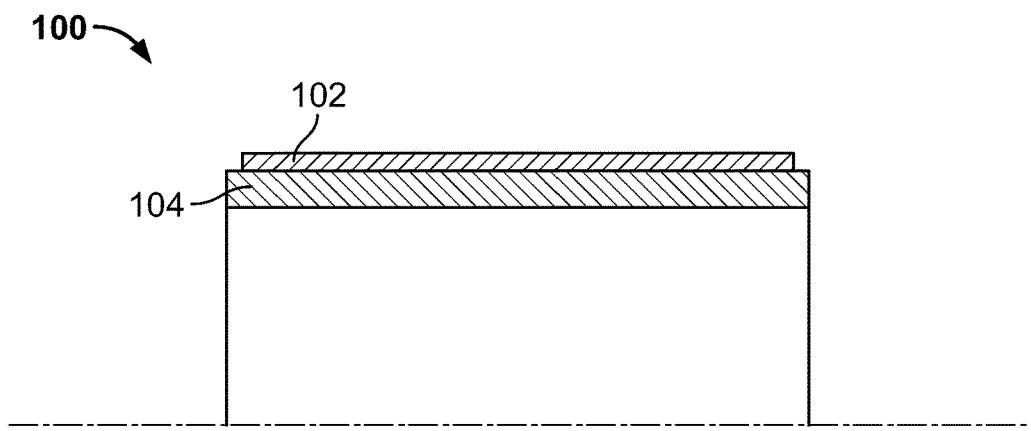
FIG. 2 is a schematic representation of an inner and an outer heat shrink sleeve according to a second arrangement.

Furthermore, as shown in FIG. 2, the outer sleeve 102 may also be formed by a pre-stretched elastomeric sleeve which is deposited on the inner heat shrink sleeve 104. This could be done in a field or in a factory.

Figure 3:
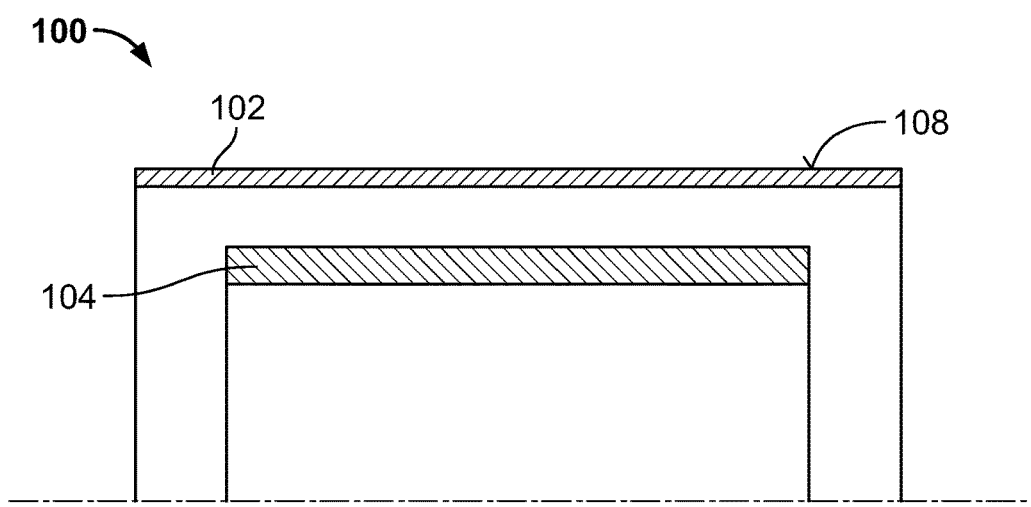
FIG. 3 is a schematic representation of an inner and an outer heat shrink sleeve according to a third arrangement.

In another embodiment, however, the outer sleeve 102 and the inner heat shrink sleeve 104 are fabricated as not being in thermal contact before the heat shrink installation process as shown in FIG. 3. In other words, the inner sleeve 104 and the outer sleeve 102 are formed as separate independent parts which can be moved freely before the installation process. On the outer surface 108 of the outer sleeve 102 additional components may be arranged to protect the surface for instance from the influence of the heat source. For instance, additional thin wall, low-cost heat shrink sleeves and/or plastic or metal films/meshes or the like may be deposited. Such layers may avoid a mechanical damaging of the surface 108, that is, dents, slits, blisters and/or chemical degradation. Moreover, such an additional protection layer on the surface 108 may also avoid the deterioration of the material properties, in particular the electrical properties, of the outer sleeve 102. The application of oils or greases which avoid sticking, i.e. silicone oil, or any substance that is performing a certain thermal conduction may reduce or avoid sticking and lead to a better heat distribution reducing local hot spots at and around the heating wires.

Figure 4:
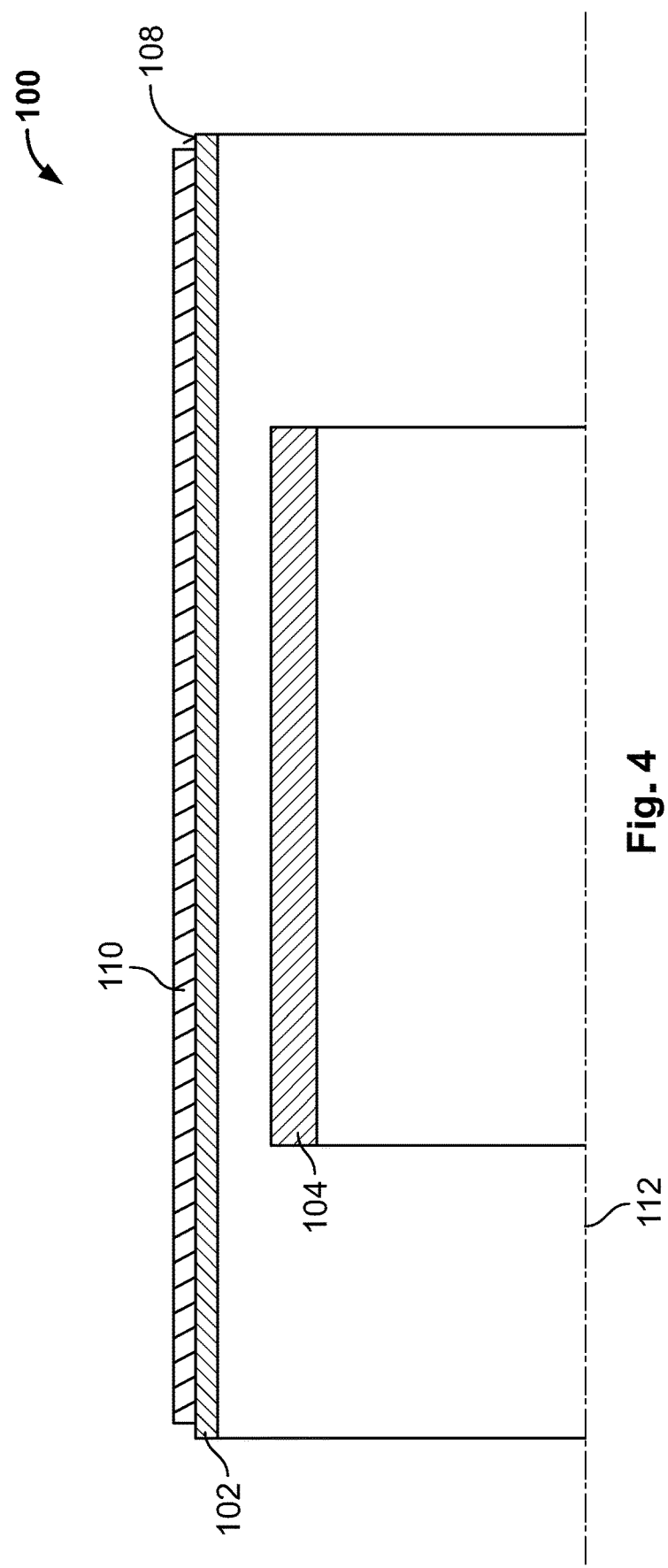
FIG. 4 is a schematic representation of an inner and an outer heat shrink sleeve and an electrical heater system according to the present invention.

As shown in the embodiment of FIG. 4, the cover 100 further comprises an electrical heating system 110 which is arranged on the outer surface 108 of the outer sleeve 102. The heating system 110 provides all the thermal energy required to shrink the outer and the inner sleeves 102, 104. In the embodiment shown in FIG. 4, both sleeves 102, 104 comprise at least one heat shrink layer that allows the sleeve to recover to a smaller diameter when being heated up to the recovery temperature.

In an embodiment, the heating system 110 located on the surface of the outer sleeve 102 may be at least one electrical heating unit as described in European patent application EP17181401.5. In particular, the at least one electrical heating unit on the surface of the outer sleeve 102 is providing all the thermal energy required to shrink the outer and the inner sleeves.

In an embodiment, the outer sleeve 102 is longer than the inner sleeve 104 in the longitudinal direction along a middle axis 112. Thus, a reliable sealing of the connection which is covered by the first and second sleeves 102, 104 can be achieved. However, the first and second sleeves 102, 104 may of course also have the same length.

Figure 5:
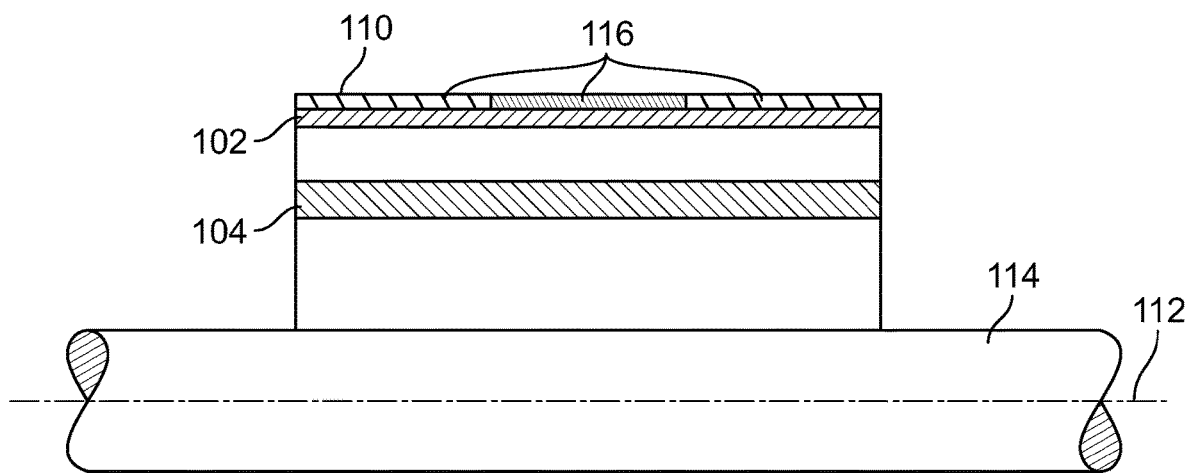
FIG. 5 is a schematic representation of an inner and an outer heat shrink sleeve and an electrical heater system according to a further embodiment of the present invention before the heating takes place.
Figure 6:
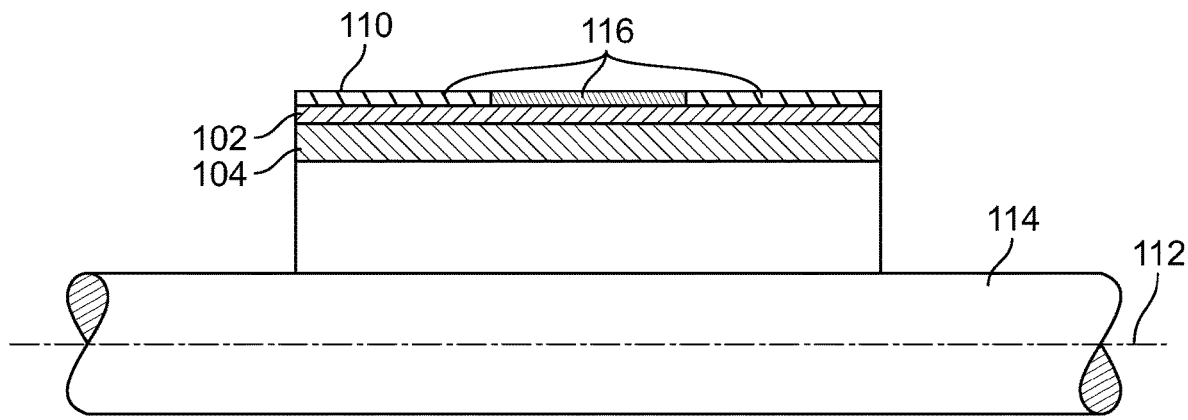
FIG. 6 is a schematic representation of the arrangement of FIG. 5 during the heating process.
Figure 7:
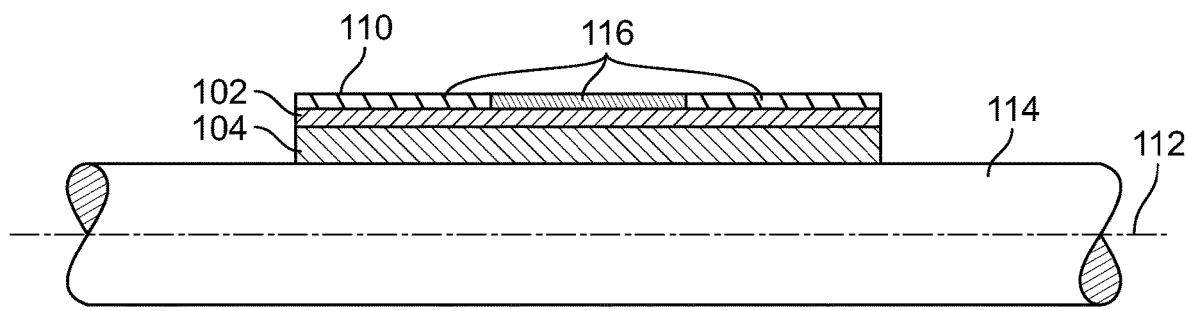
FIG. 7 is a schematic representation of the arrangement of FIG. 5 after completion of the heating process.

FIGS. 5 to 7 schematically illustrate an installation process according to the present invention. In a first step, the inner sleeve 104 and the outer sleeve 102 are arranged to encompass a component to be covered 114. In FIGS. 5 to 7, this component is represented by a cable, but usually the component to be covered 114 is an electrical connection as this will become apparent from the following Figures. According to the present invention, a heating system 110 is arranged on the outer surface of the outer sleeve 102. The electric heating system 110 may have a plurality of heating units 116. In an embodiment, these heating units 116 may be powered separately, so that the underlying regions may be heated differently along the longitudinal axis 112.

The heating unit 116, as shown in FIG. 6, first heats the outer sleeve 102 which after heat recovery and contraction touches the outer surface of the inner sleeve 104. When the outer sleeve 102 touches the inner sleeve 104 below, the heat is being transferred into the inner sleeve 104. After a certain time, the inner sleeve 104 is heated up to shrink temperature. The term "heat recovery" according to the present invention is intended to be understood in its broadest sense, and may comprise various phases, such as pre-heating, heating until the start of the shrinking process, heating during the shrinking process, and post-heating.

Then, the two sleeves 102, 104 contract together until further sleeves on the inside are contacted. Finally, the entire assembly contracts until it conforms to the component 114 underneath, as shown in FIG. 7. The component 114 underneath may be an MV cable jointing area with at least two cable ends and at least one connector for the main conductors.

Figure 8:
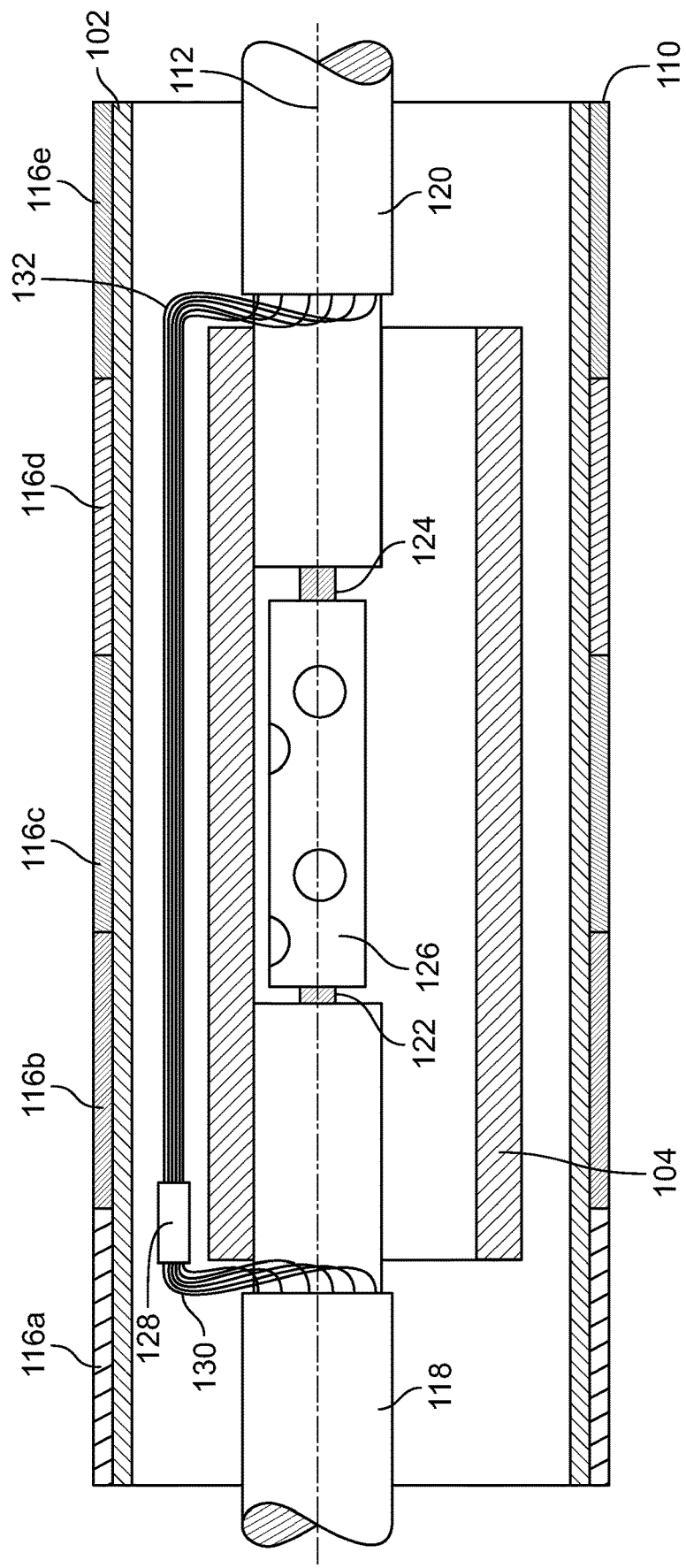
FIG. 8 illustrates a cable joint with an inner and an outer heat shrink sleeve and an electrical heater system according to a further embodiment of the present invention before the heating takes place.
Figure 9:
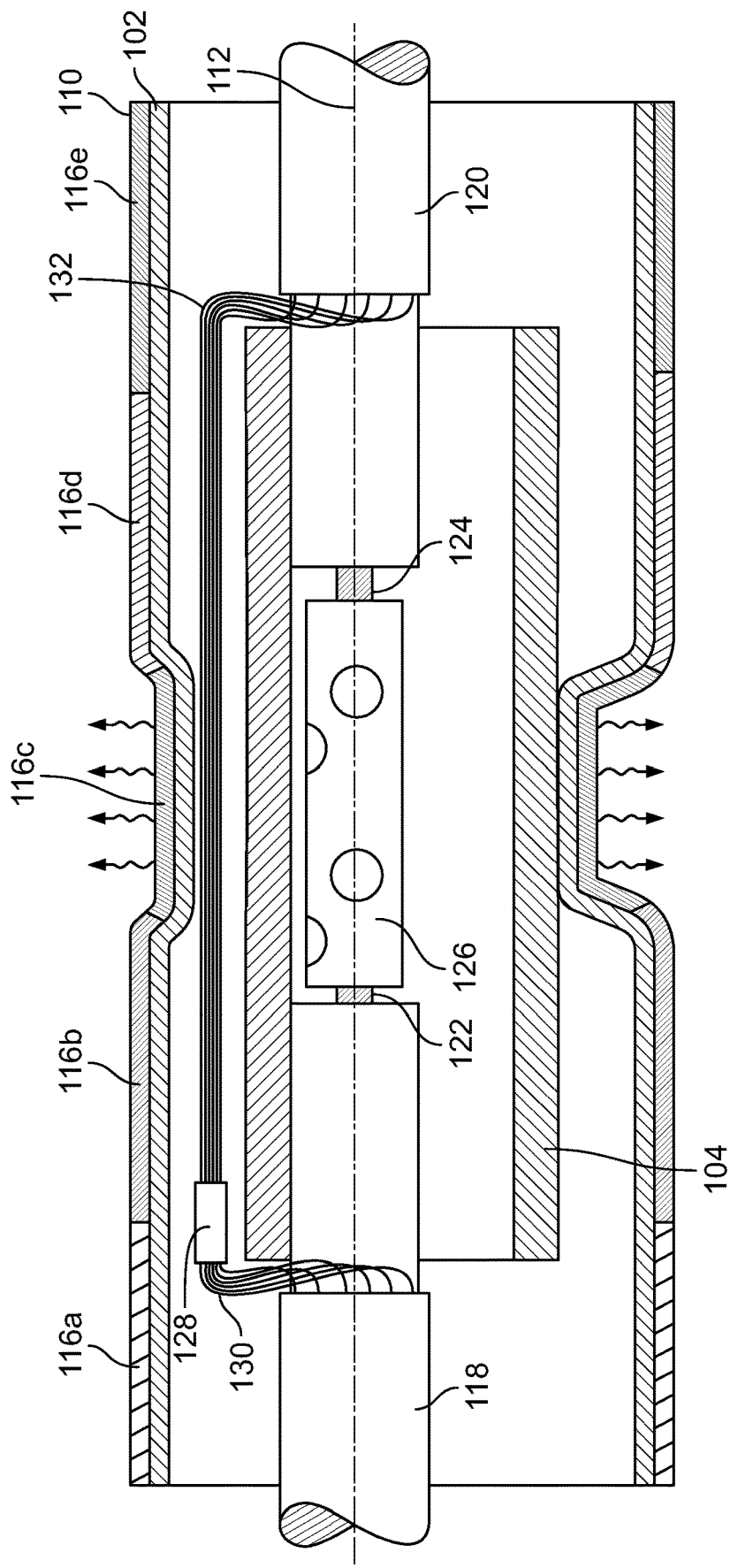
FIG. 9 is a schematic representation of the arrangement of FIG. 8 during the heating process.
Figure 10:
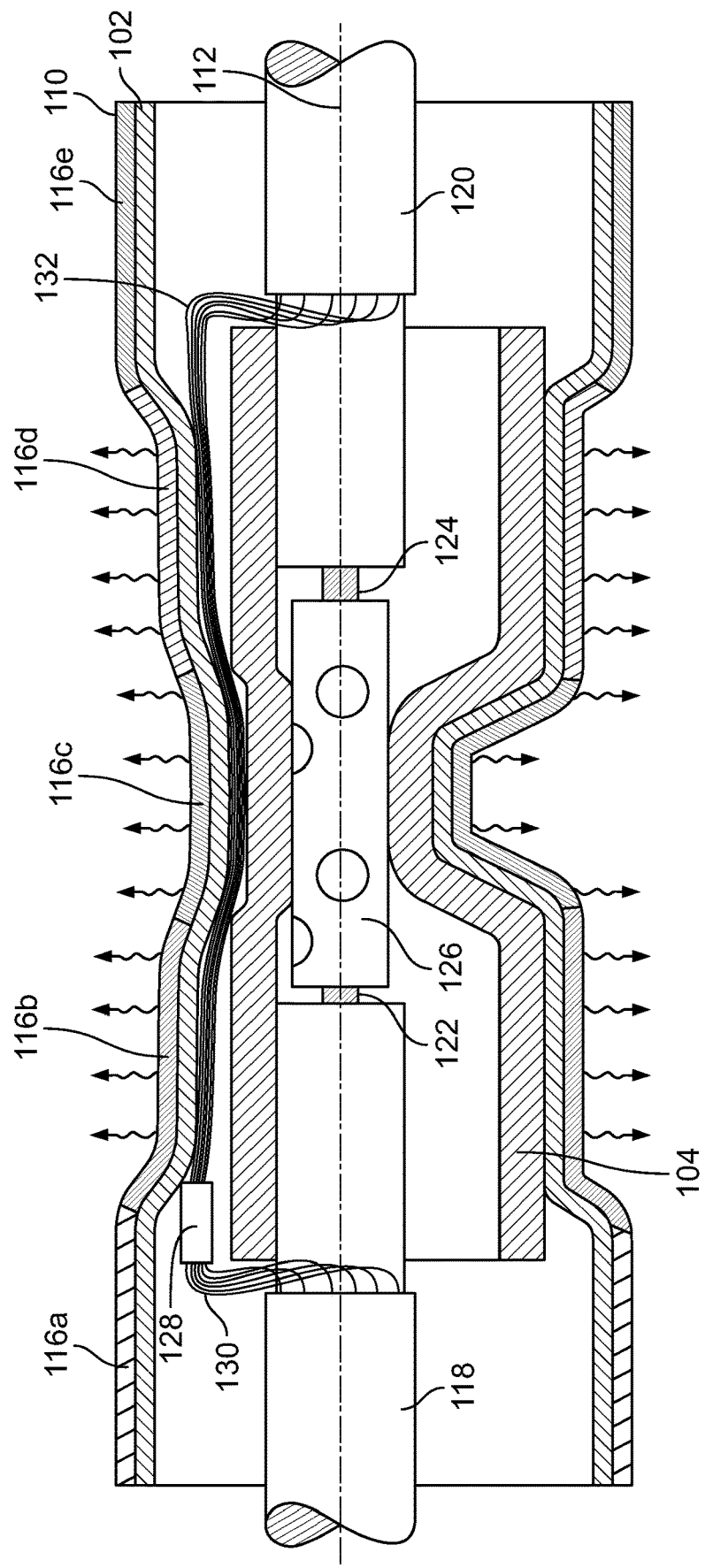
FIG. 10 is a further schematic representation of the arrangement of FIG. 8 during the heating process.

FIGS. 8 to 10 illustrate an exemplary arrangement, where an MV cable jointing area is covered by a joint body forming the inner sleeve 104 and a rejacketing sleeve forming the outer sleeve 102. Both sleeves 102, 104 are heat recoverable, i.e. they comprise at least one heat shrink layer. According to this embodiment, a first cable end 118 is connected to a second cable end 120. A first main conductor 122 and a second main conductor 124 are connected to each other by an electrical connector 126. An electrical shield connector 128 is provided for electrically connecting a plurality of first electrical shield wires 130 of the first cable 118 and a plurality of second electrical shield wires 132 of the second cable 120. The electrical shield connector 128, the first electrical shield wires 130, and the second electrical shield wires 132 may be referred to as an electrically conductive screen connection.

This shield connector is attached before the rejacketing sleeve 102 carrying the heating system 110 is arranged around the cable connection area. It should be noted, that the arrangement is slightly asymmetric due to the shield connection. The connection of the cable shields 128 may be done by arranging the shield wires 130, 132 of both cables into a common connector or, in case of tape shielded cables, an according system with so-called cheesegraters may be used. Separate elements like a rod, a number of wires, a braid and/or a number of metal stripes which are connected to each cable shield are possible as well. It is beneficial to have this element having a certain elasticity to allow for conforming to the outer shape of the installed joint body to some extent. The pre-installed cable shield connections may positioned mainly on the top of the joint body. Due to gravity, the joint body has contact to the connector and the cable at the upper area. During the heat shrink process there is the least deformation and relocation in this area. This is important, as the shield connection systems may have a certain mechanical stiffness which could negatively impact the shrink process and/or cause damage or puncture to the rejacketing or to the joint body.

According to an exemplary embodiment of the present invention, the heating system 110 comprises five adjacent heating units 116a to 116e. The more than one heating units may at least partly overlap each other or are positioned one-beside-the-other. The heating units 116a to 116e are energized at different times during the heat shrink installation process. In an embodiment, the heating unit 116c, which is located in the center above the connector 126, is energized to a high level in a first phase as this is shown in FIG. 9. Thereby, the central region of the outer sleeve 102 starts contracting towards the inner sleeve 104. In a next phase, later, the heating units 116b and 116d are energized exclusively or in addition to the heating unit 116c as this is shown in FIG. 10. Finally, the outermost heating units 116a and 116e are later energized, so that the rejacketing sleeve 102 seals the connection completely. At this time, the heating units 116c and also the heating units 116b and 116d may not be energized or energized at a lower level to create a post heating or just due to the fact that once the shrink process has started lesser amounts of energy are required to continue the heatshrink installation. The term "later" is defined either by a certain time, i.e. a number of minutes, or it is defined by a certain status in the heat shrink installation process which is e.g. the outer sleeve 102 is starting to contract, or it has contracted onto the next inner sleeve 104, or all sleeves including the innermost sleeve are contracting together or all sleeves have finished contracting and touched the substrate underneath.

The sequence of controlling the heating units 116a to 116e may either be defined by certain absolute time intervals or by certain states in the heat shrink installation process. For instance, it may be determined when the outer sleeve 102 is starting to contract, or when it has come into contact with the next inner sleeve, or when all sleeves, including the innermost sleeve, are contracting together, or when all sleeves have finished contracting and have touched the substrate underneath. Moreover, the heating units 116a to 116e may also be arranged to be overlapping or be distanced from each other, instead of being arranged adjacent to each other as this is shown in FIGS. 8 to 10.

Furthermore, apart from just energizing the heating units 116*a* to 116*e*, i. e. switching them on or off, the heating units 116*a* to 116*e* may also be controlled to heat at different power levels. For instance, for performing pre-heating and post-heating steps, the heating units 116*a* to 116*e* may be driven with lower levels of power, in addition to energizing them to a high level which is sufficient to perform the heat shrinking process of the sleeves. Thereby, the installation process can be sped up and the thermal stress on the components and the underlying substrate is reduced. For a reliable performance, in many cases the gradual shrinking process, starting with the center portion of the joint body and then continuing towards the ends of the joint body and finally to the ends of the rejacketing sleeve, is required.

Moreover, the idea of locating multiple heating units 116*a* to 116*e* along the length of the outer sleeve 102 and sequentially energizing them is continued until the end of the rejacketing sleeve. This allows to drive out air and/or avoids enclosing air especially in the electrical interfaces or in the sealing areas of the cable jacket. A comparable effect can be achieved by using overlapping heating units which create more energy in the overlap areas. So, the shrinking process starts in the overlapping areas.

In case of installing MV joints using heat shrink joint bodies and heat shrink sleeves as rejacketing sleeves, the average power density of the heater systems 110 may be between 0.1 W/cm$^2$ and 4.0 W/cm$^2$, preferably between 0.2 W/cm$^2$ and 0.8 W/cm$^2$. It was found that the installation of for instance a typical 24 kV joint body type ERIC-45/17 and an outer rejacketing sleeve type WCSM-90/25-650 both of TE Connectivity would require a power of less than 500 W and the installation may take about 20 minutes. To heat-up the heater systems 110 with up to 24 Volts to temperatures that allow for a quick and reasonably fast installation process of about 10-30 minutes for a standard 24 kV inline joint, copper conductors with following values of diameter and length may be used as heating wires:

Diameter 0.15 mm to 0.8 mm, such as 0.2 mm to 0.4 mm, for instance:
  diameter 0.22 mm and a length of 1.5 to 4.0 meters, for example 3.3 meters,
  diameter 0.28 mm and a length of 3.0 to 9.0 meters, for example 6.2 meters,
  diameter 0.35 mm and a length of 6.0 to 12.0 meters, for example 9.3 meters.

The carrier material for the heating wires may be polyimide (PI) or polyethylene naphthalate (PEN) film with adhesive material. The thickness of the film may be in the magnitude of 10 microns but less than 80 microns. This supports wrinkling and folding with low forces when the heat shrink components contract. The heating elements may consist of two polymeric films, one or both of them covered with adhesive. The heater wires may be laid in meanders with spacing of the conductors of at least 3.0 mm to avoid delamination of the films before or during installation process.

Furthermore, in case of installing MV joints using heat shrink joint bodies and heat shrink sleeves as rejacketing sleeves, the size of the heater systems 110 may be chosen to have at least one heater system in the center area above the connector having a width of e. g. not more than 50 mm longer than the connector, and in an embodiment, be as long as the connector or up to 70% shorter. Heaters 110 above the area of the joint body should not be more than 50 mm longer on each side of the joint body end, but may be 20 mm longer on each side and not shorter than 10 mm on each side. The heaters at the end of the rejacketing sleeve should not be more than 60 mm longer on each side but may cover until the end of the rejacketing sleeve or are preferably up to 15 mm longer than it on each side.

The concept of having shorter heater systems than the length of the connector supports a reliable starting of the shrinking process in the center area over the connector. The much shorter length of the center heater(s) is also important as there are positioning tolerances of the rejacketing sleeves relative to the joint body. If the heaters 110 are longer by more than 20 mm as the joint body, this may result in shrinking of a portion of the rejacketing sleeve beyond the end of the joint body which may lead to air entrapment. If the heaters 110 are about as long as the joint body or shorter this may result in incomplete shrinking of the joint body. If then the next heaters are energized the rejacketing sleeve may contract relatively fast which may lead to entrapping air under the sleeve which would not lead to electrical failure of the joint, but potentially to a failure of the interfaces between cable sheath and rejacketing sleeve which seals against ingress of water or other substances. Having heaters being longer than the rejacketing sleeve guarantees that the rejacketing sleeve shrinks completely till the ends. Due to loss of heat to the environment overhanging heater systems was found a simple means to compensate for the losses.

Although the abovementioned is referring to arrange heating systems majorly side-by-side with no or little overlap, similar effects can be achieved and comparable design parameters are valid in case of using widely overlapping heating systems.

Figure 11:
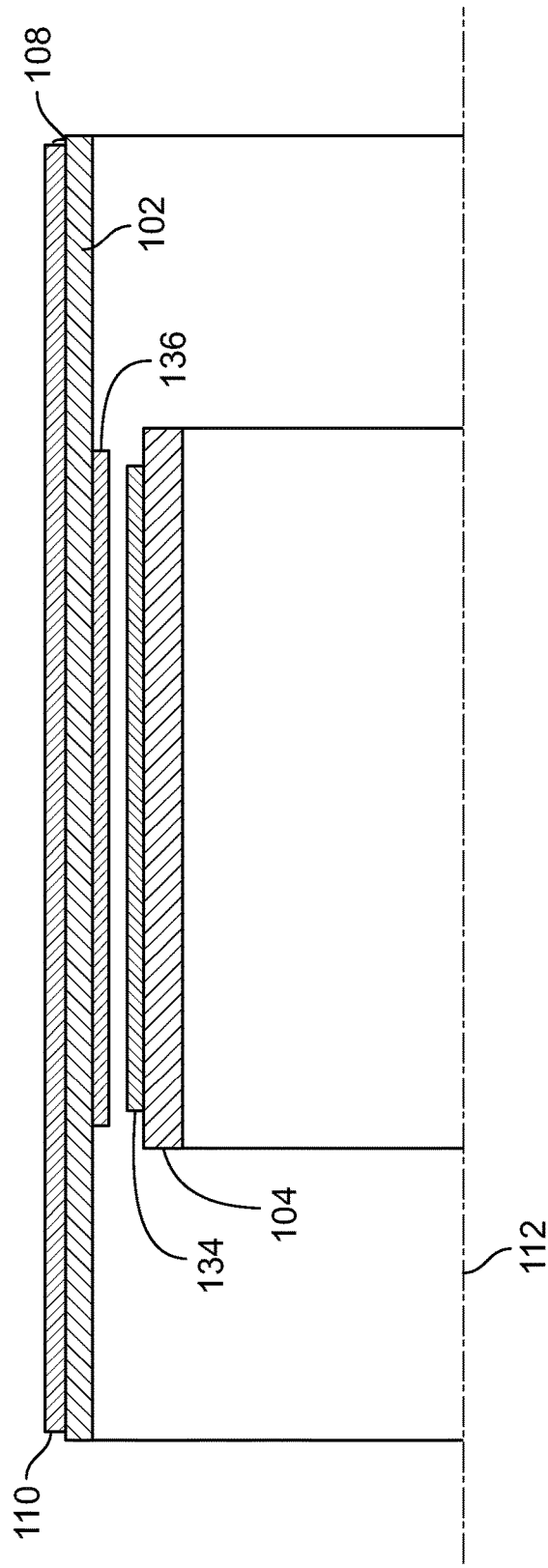
FIG. 11 is a schematic representation of an inner and an outer heat shrink sleeve and an electrical heater system according to a further embodiment of the present invention.

As shown in FIG. 11, the joint body 104 may comprise on at least parts of its outer surface a thin metal film 134 to improve the performance of the shield connection system and/or the performance of the outer conductive layer of the joint body 104. This layer 134 may also provide some mechanical protection and distributes the forces exerted by an additional pressing devices, which will be described in more detail below. Furthermore, also the rejacketing sleeve 102 may comprise on at least parts of its inner surface a similar thin metal film 136. The first and second metal films 134, 136 may have a thickness between 10 μm up to 150 μm, or between 13 and 40 μm. The metal films may also perform a certain heatspreading effect.

The wires of these meshes may be that thick that they may puncture or harm the sleeves around during the shrinking process, if the installation is done according to the present invention, where the mesh would have to be taped before shrinking the joint body 104. Further, the installation of the mesh in the factory would cause significant additional cost. This is why thin metallic films with thickness' between 10 microns up to 150 microns, for example 13 to 40 microns, may be used, as they have the least chance to mechanically harm the components around and are low cost products and can be pre-installed in the factory at low cost. In principle, these films could also be wrapped around in the field prior to heatshrink installation.

In order to improve the heat spreading between the windings of the conductors in the heating systems, additional thermally conductive material for instance metallic films (aluminum or copper) with a thickness between 5 microns and 100 microns, for example 15 microns to 30 microns with minimum one, and an in embodiment two windings can be wrapped outside the heater systems 110. It is also possible to position the heat transfer film additionally or exclusively between the heater systems 110 and the heat shrink product. This, however, may lead in a number of cases to difficulties in removing the film after installation due to sticking to the heat shrink sleeve. Another option is to have metallic layers bonded or galvanized to the outer surface of the heater systems. This may increase product cost more than separate layers of thin film.

The interface between the outer surface 108 of the outer sleeve 102 and the heating system 110 may be filled with a substance that avoids sticking of the heater system 110 to the surface 108. Beside powders like for instance Teflon, also small amounts of silicon oil or the like can act as such a release agent. This release agent material should stand the heating temperatures which may be up to 200° C. and above. The release agent material may be filled with substances that improve the heat transfer like metal powders.

In an embodiment, the method may further comprise the step of attaching a thermal insulation sleeve for at least partly covering the heating unit 110. Such a thermal insulation at least partly prevents heat from escaping into the environment. Thereby, firstly the efficiency of the heating is enhanced. Furthermore, heat transfer to adjacent objects is avoided which may be important from a safety aspect.

In an embodiment, the method may comprise the step of attaching an electrically conductive screen connection between the inner sleeve 104 and the outer sleeve 102 before performing the heat recovery step.

Figure 12:
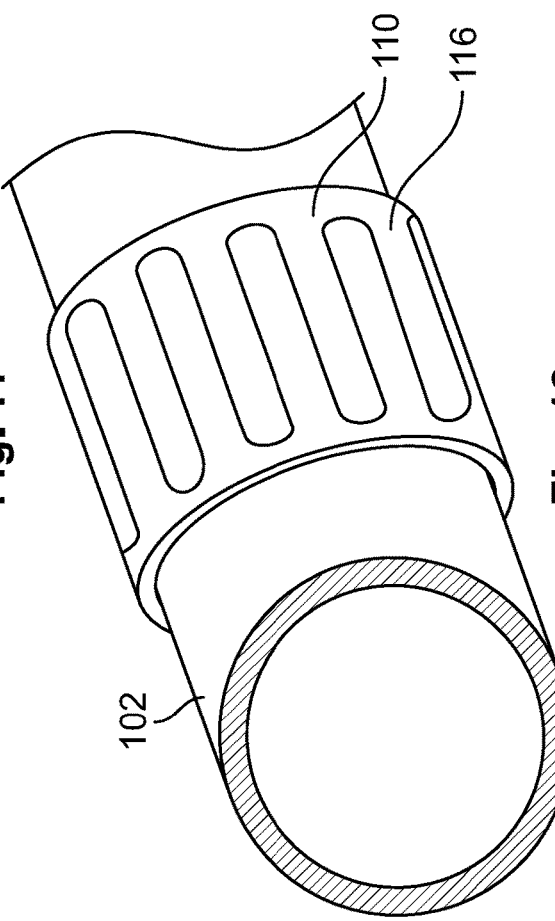
FIG. 12 illustrates a heating unit according to the present invention.

FIG. 12 illustrates a heating unit 116 (which represents the complete heating system 110 in the shown arrangement) mounted on an outer sleeve 102. The heating unit 116 is wrapped around the heat shrink sleeve 102 covering, in an embodiment, the entire circumference in a certain area. Due to its stiffness and potentially irregular non-round shapes of the sleeve resulting from its manufacture and in order to contact during the entire shrinking process, the heating unit 116 must be pressed against the sleeve 102 at varying diameters. After the sleeve 102 starts to shrink, this radial pressure is maintained until the sleeve 102 is fully installed. The substrate underneath may not be cylindrical and/or may have irregular shapes and/or varying diameters, like it is the case with cable joints of MV applications. So the outer shape of the installed heat shrink sleeve 102 is non-cylindrical as well. Thus, a device to generate radial pressure is provided according to the present invention, which is configured to generate the pressure even with the irregular and diameter changing outer shapes of the sleeve during and at the end of the installation process.

Figure 13:
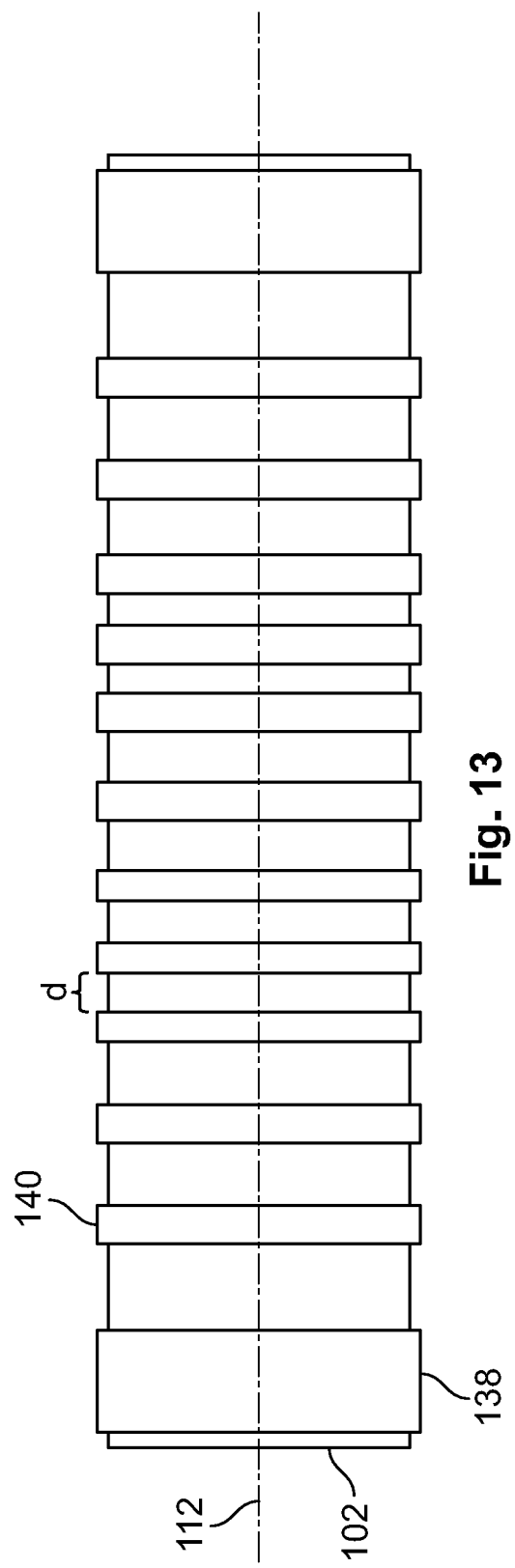
FIG. 13 illustrates a press-on device according to a first embodiment of the present invention.

FIG. 13 illustrates a first embodiment of a pressure device 138 for exerting radial pressure on the heating system 110 to be pressed onto the outer sleeve 102. The pressure device 138 may comprise a plurality of elastic rings 140.

Generally, it is desired to provide radial pressure and thus the thermal contact between the heating system and the heat shrink component (the sleeve) during the entire shrinking process. In principle, it may be sufficient if the contact only exists during an initial phase when the sleeve is being heated to heat shrink conditions (i.e. 120° C.) and then there is no contact any more when the sleeve contracts. During that phase, the heaters would only heat the growing cavity between heater and contracting heat shrink sleeve which may be sufficient in many cases. Further, it was found that increasing radial pressure by certain amounts increases heat transfer and makes installation faster and more repeatable. Varying radial pressure may be purposely used to generate shrinking in certain regions of a product happen earlier than in other areas with less radial pressure. According to aspects of the present invention, thermal contact between the heating systems made from non-heat shrink and non-elastomeric materials and the heat shrink sleeve is established through force-fit.

As shown in the embodiment of FIG. 13, over the length of the sleeve 102, a number of compression rings 140 are positioned. The rings 140 may be made from elastomeric material like EPDM or silicone and are pre-stretched. Alternatively, the rings 140 are metal spring elements. The rings 140 may also be made from heatshrink material. Over the length of the sleeve 102, not only the number and spacing d of the rings 140 may be varied, but also their shape, material or any other parameter. Thus, the impact of the sleeve's diameter changing irregularly during the heat recovery process can be taken into account.

Figure 14:
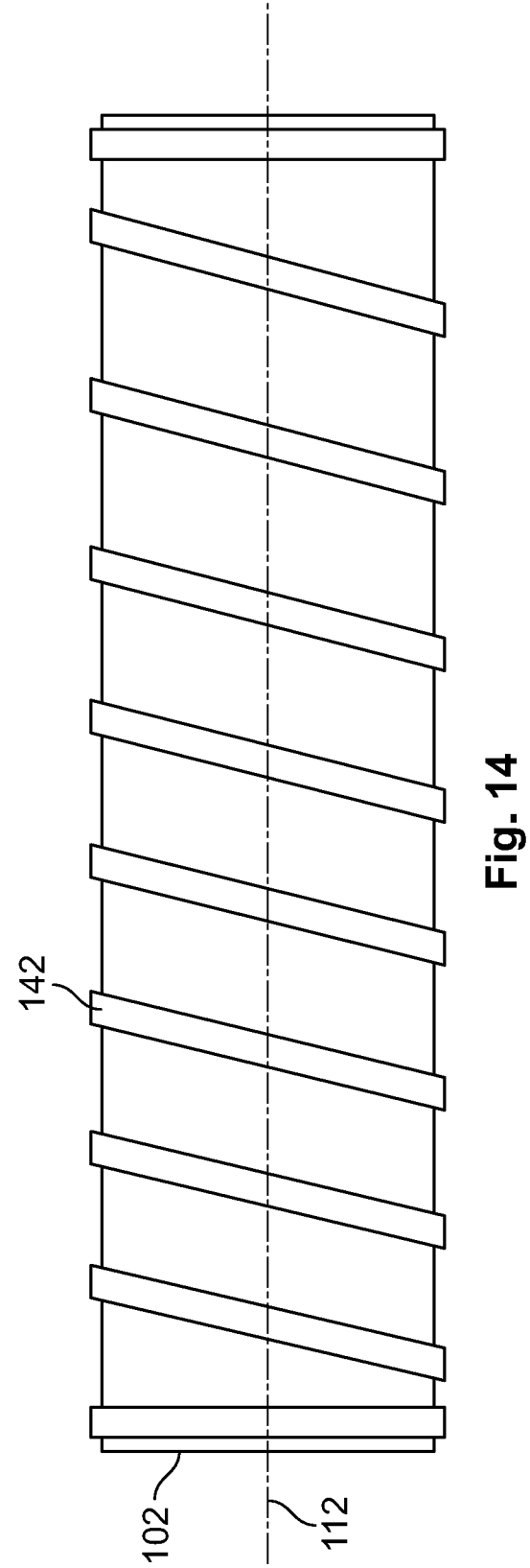
FIG. 14 illustrates a press-on device according to a second embodiment of the present invention.

Another embodiment is shown in FIG. 14, where one or more elastomeric bands 142 or long metallic springs are wrapped around the sleeve in pre-stretched condition.

Figure 15:
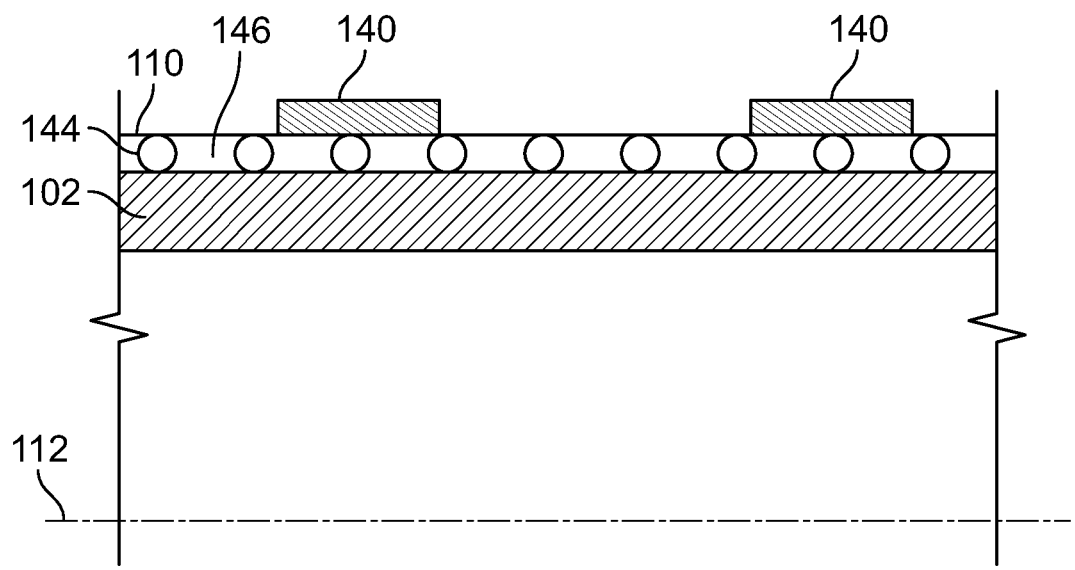
FIG. 15 illustrates a press-on device according to a further embodiment of the present invention.

Furthermore, as shown in FIG. 15, the compression rings 140 (or the elastic band 142) may be in direct contact with the heating system 110. As can be derived from the sectional view of FIG. 15, the heating system 110 may comprise one or more heating wires 144, which are embedded in a non-heat shrink and non-elastomeric carrier material 146.

Figure 16:
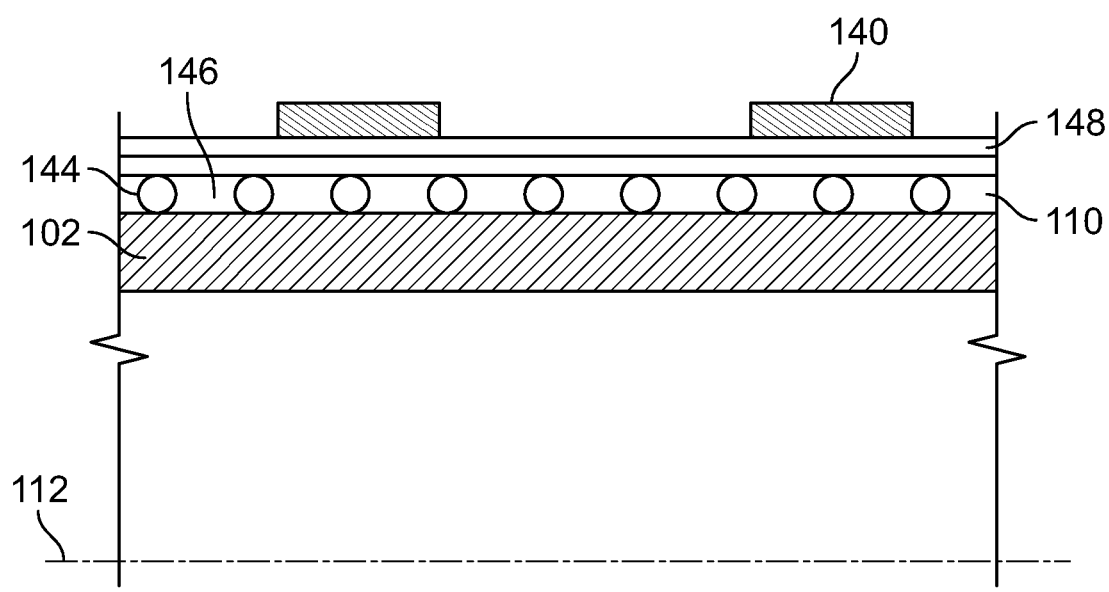
FIG. 16 illustrates a press-on device according to a further embodiment of the present invention.

FIG. 16 shows an embodiment with two additional layers of intermediate film 148 between the rings 140 and the heater 110. The one or more layers of intermediate film 148 may comprise a polymeric material or metal e.g. aluminum with a wall thickness of e.g. 15 to 35 μm, or other organic or inorganic material that can stand the temperature of 200° C. and higher generated by the heating system 110 and the pressure generated by the rings 140 or the compression band 142. Of course, one or multiple layers are an option. The films 148 may be laid flat or may be wrinkled, folded, or the like, in order to generate more stiffness along the longitudinal axis 112 of the sleeve 102. The films 148 may also a certain heatspreading effect to distribute heat from the regions of the heating wires 144 in the heating units to areas between. The metal films may also reduce permeation of substances especially moisture.

Figure 17:
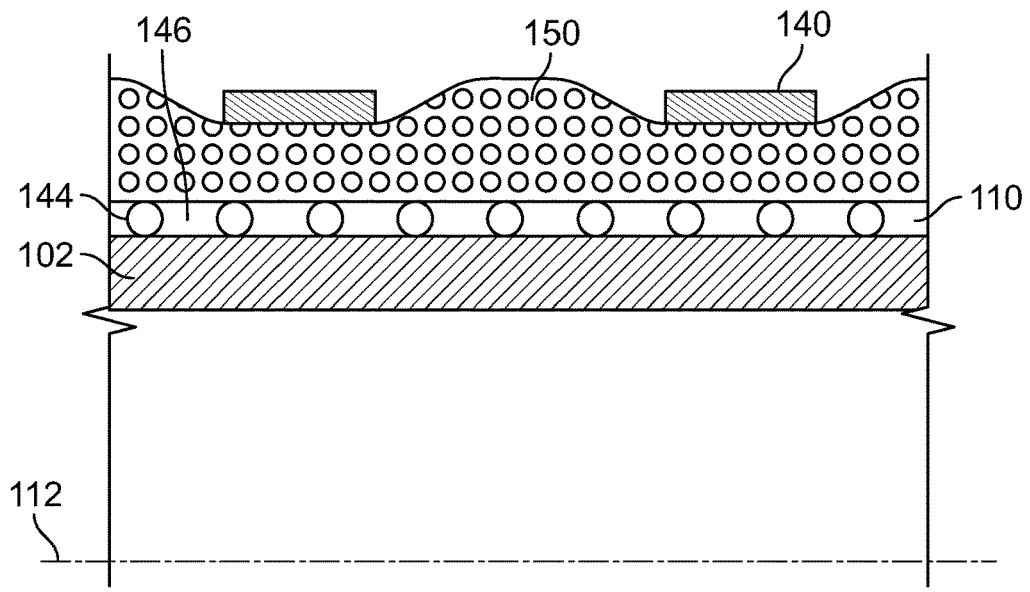
FIG. 17 illustrates a press-on device according to a further embodiment of the present invention.

As shown in FIG. 17, a material with elastic performance can be positioned as elastic intermediate layer 150 between the rings 140 (or the bands 142) and the heating system 110. Options are silicone foam or the like.

As the radial pressure should be ideally generated across the entire surface of the heating system 110, also sleeves (heat shrink or elastomeric) that are covering the entire surface or at least major parts of it can be used as the pressure device 138. However, due to the required minimal and allowed maximum radial pressure, such an elastomeric sleeve would have to be very thin which bears the risk of splitting. Also the cost of manufacture and assembly of such thin films may be high. This is why the use of individual rings 140 according to the present invention is advantageous as they can be manufactured in large quantities, have less risk of splitting due to increased wall thickness. Further they can be arranged in a variable manner within one sleeve 102 and be used for multiple sleeve lengths. The rings 140 may be manually rolled away from the jointing area after installation in order to remove the heating systems 110 and any other object located outside the outer sleeve 102. Rings 140 may also be more easily cut with a knife or scissors in order to take them off the cable after installation. The downside is to have less or no pressure in the zones between the rings 140. The arrangement shown in FIG. 17 overcomes this disadvantage by spreading the radial pressure exerted by the rings 140 through the metal films or any other elastic material.

Figure 18:
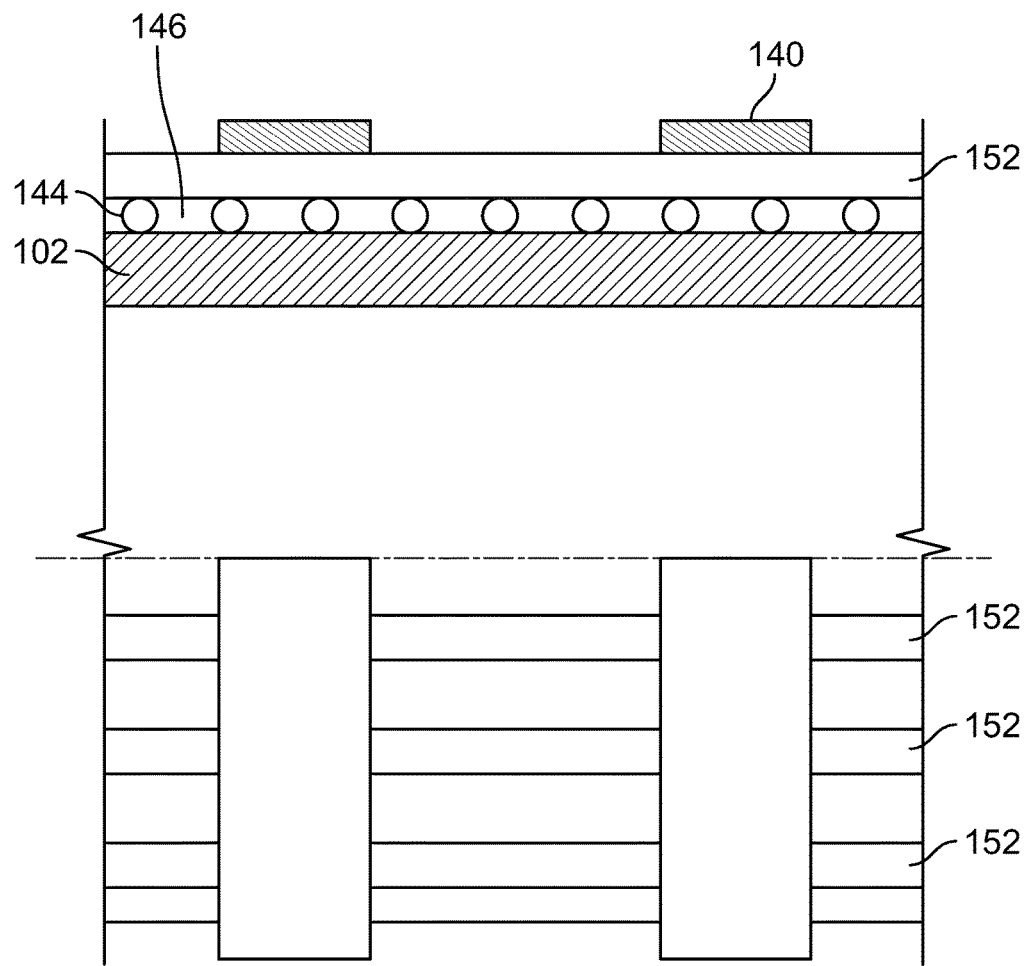
FIG. 18 illustrates a press-on device according to a further embodiment of the present invention.

Another approach to spread the radial pressure is to use additional support stripes 152 oriented mainly in axial direction along the outside of the heating system 110 and below the rings 140 as shown in FIG. 18. These support stripes 152 may be manufactured from polymeric material (thermoplastic, elastomeric or thermoset material), from metal, or from cardboard, especially corrugated cardboard.

Furthermore, it was found that even thin (metallic) films wrapped on the outside of the heating system 110 shown in FIG. 16 perform some advantageous force spreading, especially if they have a certain wall thickness or are folded or wrinkled.

Another option is to position stiffening elements on the inside of the heat shrink sleeve 102 which may be polymeric or metal films. These also spread the radial pressure from the individual rings along the axis of the sleeve.

As shown in FIG. 13, the spacing d between the rings 140 may differ along the length of the heat shrink sleeve 120. In the center, there are more rings 140 per length than at the ends. The reason for providing more rings 140 in the center is to start the heat shrink process earlier in this region, or to shrink faster. As there may be another object, i.e. another heat shrink sleeve, underneath, there will be no risk of folding and collapsing of the sleeve under the increased radial pressure. At the very ends of the sleeve the width of the rings 140 may be remarkably increased. This may be done to avoid relocation of slim rings when the sleeve contracts. In principle, it is possible to have rings 140 located partly or completely beyond the end of the heat shrink sleeve 102, as there may be the heater system 110 extending beyond the end of the heat shrink sleeve 102.

The design parameters of such rings 140 may be chosen to generate sufficient pressure to press and conform the heaters against the sleeve. The rings 140 may allow to do so even when the sleeve 102 is fully recovered. Ideally, the rings 140 generate about the same pressure at all diameters of the sleeve 102. That may mean that the rings 140 are highly pre-stretched with the starting diameter of the heat shrink sleeve 102. At maximum recovery, the loss of percentage stretch should be little, in order to ensure that there remains still about the same radial pressure. Softer material are used in an embodiment, for instance silicone with Shore hardness 20A to 40A, wall thickness between 1 mm and 4 mm, and a width of 2 to 20 mm. Respective EPDM material and shapes can be used as well.

Beside a cylindrical shape with even wall thickness of the rings 140 around the circumference, the rings 140 may have a meandering shape, or cut-outs, or the like. Pressing device 138 should not generate too high radial pressure, as this may lead to collapsing and/or folding of the heat shrink sleeve 102 before or during installation when it gets softer and/or damage the surface of the heat shrink sleeve 102.

Of course, radial pressure to generate heat transfer can be combined with other devices to generate thermal contact such as adhesive bonding or form fit. As mentioned above, however, it is desired to easily and entirely remove the heaters 110 and any other devices for non-torch heating from the heat shrink product after installation. Lubricants like silicone oil or soft adhesives being applied between heaters 110 and heat shrink sleeve 102 may be an option to enhance the performance of the generated mechanical pressure as described above without too negatively impacting the ease of removal.

FIG. 19 schematically illustrates a further problem that occurs with the outer sleeve 102, but of course also with the inner sleeve 104. Exemplarily, only the outer sleeve 102 is considered in the following, although the proposed improvements may of course also be applied to the inner sleeve.

According to the present invention, by using electrical heating systems, there is the need for applying a certain radial pressure to guarantee thermal contact between heating systems and heatshrink products. In case of thin wall heatshrink products, these very often collapse or are deformed in an unfortunate manner as this is schematically illustrated in FIG. 19. This deformation leads to a loss of thermal contact resulting in improper installation quality, such as uneven wall thickness distribution or incomplete shrinking and/or increased shrinking times. If a sleeve 102 is long and the shrinking starts in the center or at least at a certain distance from the ends, the cold sections of the sleeve prevent from collapse of the heated section of the sleeve. Thus stepwise shrinking of the sleeves is an option in many cases. But in almost all cases the ends of a sleeve 102 need to be shrunk at a certain point of time during the installation resulting in the abovementioned issues. In other cases the sleeve 102 may be that short that shrinking from center to ends is not possible.

So there is a need for low cost and easy, and reliable to install device to prevent end portions of at least thin wall sleeves from collapsing or unfortunate deformation during the shrinking process.

A first embodiment is illustrated in FIG. 20. According to this embodiment, one or both of the end regions 154 are supported by a ring-shaped support element 156, which functions as a re-enforcement ring, so that an essentially circular cross-section can be maintained (as shown in FIG. 21).

It was found that such an essentially ring-shaped part 156 positioned inside the ends of the thinner wall sleeves 102 improves the speed, reliability and quality of the shrinking process. The support elements 156 make the ends of the sleeves 102 (and/or 104) stay longer with their original diameter. Due to their rigidity, the support elements 156 allow to apply radial pressure on the sleeve 102 to press heater elements against them. The support element 156 will be pushed out of the sleeve 102 either due to the material bond becoming weak (for instance hot melt becoming soft) or mechanical fixture elements like straps break due to forces generated by the collapsing sleeve 102.

The proposed concepts relate to using additional components that are positioned at the ends 154 of (thin wall) heatshrink sleeves 102. In most cases, these parts 156 are at least partly located inside the sleeve. These essentially ring shaped support elements 156 are made for instance from thermoplastic material such as polystyrene (PS), acrylonitrile butadiene styrene (ABS) or the like, and can be from high temperature materials such as polypropylene (PP) or polyamide (PA) etc. It is also possible to make them from cross-linked materials such as polyethylene (PE-V) or from metal.

The shape of the support element 156 may be cylindrical or have a slight taper. The length may be between 5 mm and 20 mm. An additional flange 158 is provided to abut the sleeve 102 on the front side. The flange 158 improves the positioning accuracy and avoids tilting during movement thus reducing their overall length. The surface of the support element 156 may be smooth or with a certain roughness. The edges may be rounded to avoid/reduce shearing-off hot melt from the heatshrink product during the movement.

The ring 156 may be positioned inside the sleeve 102, as shown in FIG. 20. It may be fixed by additional mechanical devices (straps, fixture elements) or by press fit, or it is fixed by material fit. This may be achieved by shrinking the sleeve 102 onto the ring 156 or by using additional adhesive. The fit may be on most portions of the circumference or only in some areas. The ring 156 may also allow for some diameter adjustment.

Once the ring 156 is moved away from the end portions 154 of the sleeve 102, the ring's design may be such that it allows an easy removal from the cable, for instance by having a two-piece design, by having a hinge, or by having an area with reduced wall thickness for easy cutting. On the other hand, the ring 156 may also be purposely designed for remaining on the cable after installation as it may contain information, for instance for product identification or for traceability.

Another concept for improving the installability of thin sleeves 102 is based on pieces of (pre-expanded) heatshrink sleeve which are positioned inside or outside of the heat shrink sleeve 102. For instance, short pieces of a heat shrink sleeve with hot melt coating can be bonded to the end portions of another heat shrink sleeve 102 which is to be shrunk. The sleeve portions may be a full ring or be located only at portions of the circumference.

A further advantage of providing the additional support elements 156 proposed in the present disclosure is to force the end portions 154 of the sleeves 102 to adopt a more circular cross-sectional shape. In particular, some sizes of heat shrink sleeves are delivered after cutting operation in production and finishing in a kind of flattened condition with two bent sections (see FIG. 1). The ring elements 156 may force these sleeves 102 to adopt a much more round shape at least at the ends where they are positioned.

Figure 22:
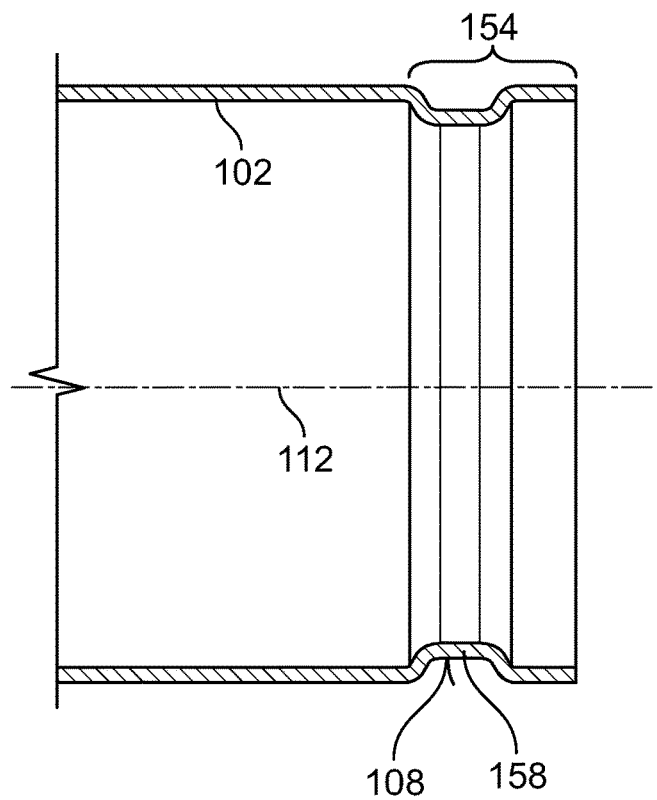
FIG. 22 schematically illustrates a side view of a heat shrink sleeve with a re-enforcement region.

According to a further advantageous example, instead of or in addition to the support ring 156, the end region 154 of the sleeve 102 may also be reinforced by an area 158 of reduced diameter, as shown in FIG. 22. This area 158 of reduced diameter stabilizes the heat shrink sleeve 102 even when heating elements are directly arranged around the end region 154 of the sleeve 102, because the heating elements are radially distanced further away from the outer surface 108 in the area 158 of reduced diameter so there is no direct conduction heating from the heater element possible. As a heatshrink material is much more mechanically stable at room temperature or at i.e. 60° C. than the same material at about heatshrink condition temperatures, which is typically 120° C., this area 158 acts as a ring-shaped mechanical reinforcement element that disappears after this region is heated to heatshrink temperature. For instance, such an area 158 may be formed by pre-shrinking the tube in the area 158.

Turning now to FIGS. 23 to 26, a method of thermally insulating the heating system according to the present invention will be explained in more detail. As mentioned above, small thermally insulating part may be used for keeping the heat that emanates from the heating system close to the heat shrink sleeves that have to be shrunk around an object to be covered.

The proposed concepts relate to using low cost organic or inorganic fillers contained in bags or pouches. Organic fillers may be paper or cardboard. Inorganic fillers may be foamed glass or foamed perlite and the like. All these materials can be sourced at minimal cost. The card board and the paper need to cut into small pieces.

Figure 23:
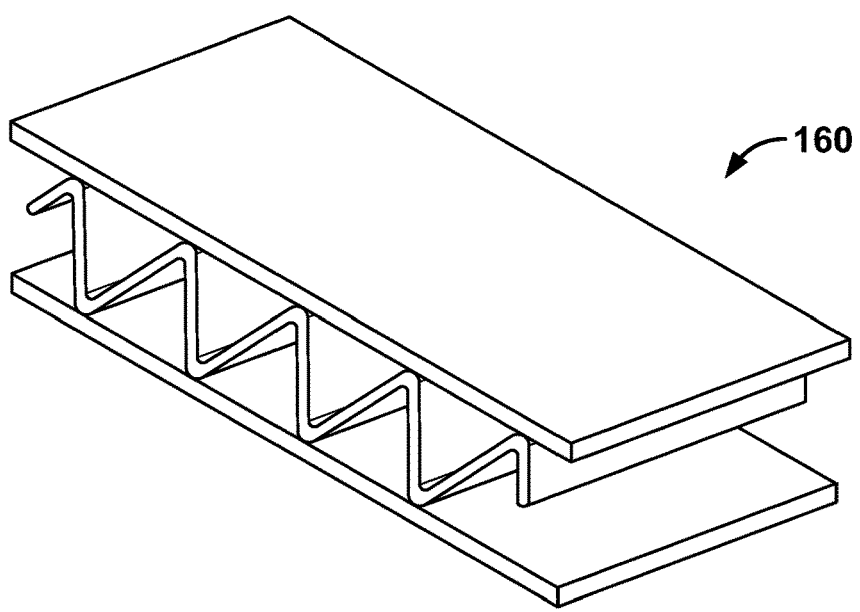
FIG. 23 schematically illustrates a thermal insulation material usable with the present invention.

One possibility of realizing such thermally insulating part as shown in FIG. 23. The thermally insulating part 160 shown in this Figure is formed by a piece of double-faced single wave corrugated cardboard. Of course, other types of corrugated cardboard, such as double-wave cardboard, may be used as well. The advantage of using cardboard pieces as thermally insulating parts 160 can be seen in their excellent thermal insulation characteristics on the one hand, but also in their cheapness and the possibility of easily disposing of the insulating material after use. Similar shapes are possible for paper. Another option for paper is to cut it into small pieces of i.e. 5 cm×5 cm and then wrinkle them. Of course, combinations of above mentioned filler materials and/or different geometric executions of them are possible.

The abovementioned materials can withstand the radial pressure generated by the pressing elements used to press the thermal insulation and the heating systems as well onto the heatshrink product.

The thermally insulating materials are typically filled into bags or pouches which are sealed around the circumference for instance by bonding or welding. The layer thickness of these loose materials is about 1 mm to 20 mm. It was found that it is important to avoid large amounts of movement of the fillers in the bag before and during installation. Vibrations during transport of the products and the intrinsic movement and deformation of the thermal insulation during the installation process of the heatshrink products may cause areas where the layer thickness of the fillers get below certain limits. In some cases areas without any filler may occur. In order to prevent from this the filler may be bonded to the enclosure or may stick to itself. The filler particles may also engage with each other due to their shape, surface or surface finish.

Another option is to have separating elements like strips made from plastic or cardboard inside the bags (also called pouches). FIGS. 24 and 25 illustrate a thermally insulating unit 162, which is formed from a pouch 166 containing thermally insulating parts 160 separated from each other by partition walls 164.

Another option is to insert welds (or seams) 170 that form individual chambers 168 in one bag 166, as shown in FIG. 26.

It is also possible to provide bags 166 with a thickness that is a fraction of the required thickness. The thermally insulating unit 162 is then put onto the substrate in two or more layers. Typical materials for the bags 166 are high temperature plastic films such as PA or PI. As there are remarkably lower temperatures on the outside of the thermal insulation, this side can be made from lower temperature materials such as PET. If the thermal insulations are used only once, it is possible to use a lower performing material on the inside as well and take into account that the bag 166 may partially melt during the installation process. In this case, a bag 166 may be entirely made e. g. from PET. In cases where the thermal insulation needs to be pressed against the substrate underneath, the bags 166 may perform some elastic deformation themselves, for instance by using elastomeric films or comparably performing materials.

Figure 27:
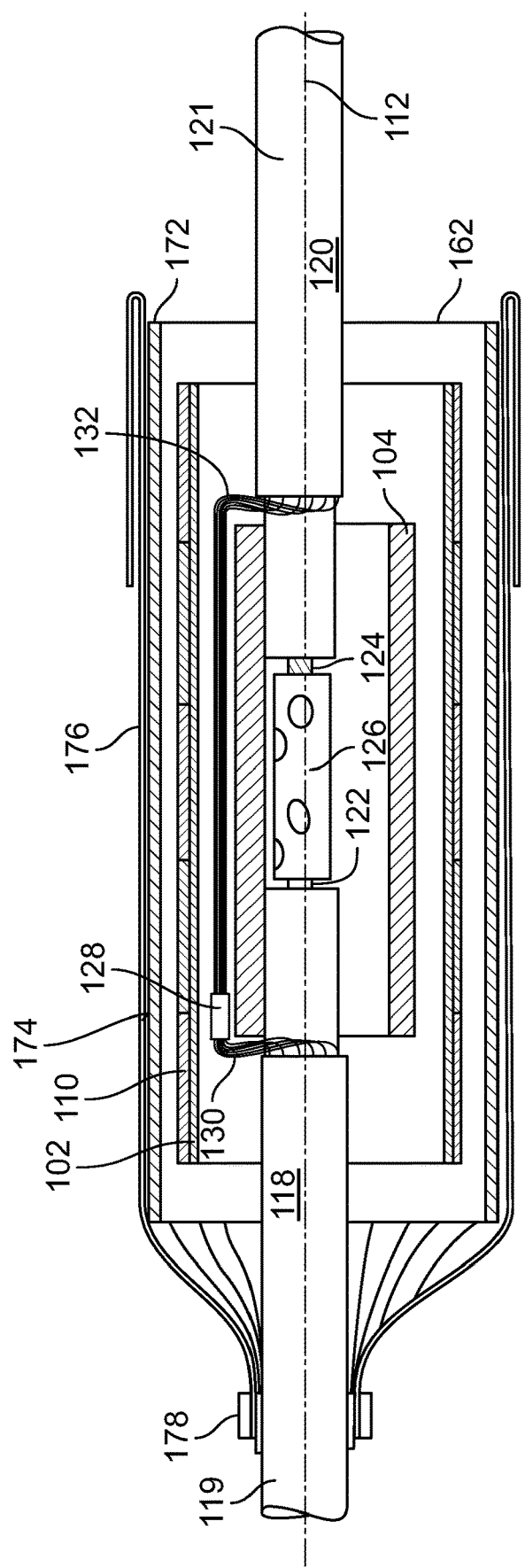
FIG. 27 shows a cable joint with an inner and an outer heat shrink sleeve, an electrical heating system, and a thermal insulation according to a further embodiment of the present invention before the heating takes place.

FIG. 27 shows a cable joint with an inner and an outer heat shrink sleeve 104, 106, an electrical heating system 110, and a thermal insulation according to a further embodiment of the present invention before the heating takes place. Instead of using thermal insulations constructed as shown in FIGS. 24 to 26, the thermally insulating unit 162 comprises a housing 172, which is arranged around the jointing area and, in the shown embodiment, closes it at either end. This creates a thermal and mechanical cover. It could be shown that the temperature measured on the outside can be kept below 70° C. The maximum temperature on the inside (directed towards the heater systems) should be 250° C., the maximum temperature on the outside 120° C., and in an embodiment below 60° C. Radial pressure applied by for instance elastomeric bands should be transmitted, while allowing for circumferential contraction down to about one third of the original diameter. No hazardous substances should be generated when the thermal insulation is exposed to the envisaged temperatures and (with an additional safety margin) up to 350° C.

The pressing devices 140 are arranged as shown in FIG. 16, where they press directly onto the layers of aluminum without pouches between or around. It was found that the housing 172 can be made from folded corrugated cardboard, for instance having an essentially octagonal cross-section perpendicular to the longitudinal axis 112. Of course, also other cross-sections can be used, for instance hexagonal or rectangular cross-sections. Accordingly, the housing 172 may be fabricated by connecting eight, six, or four essentially rectangular plates in an angled manner.

Furthermore, also circular cardboard tubes can be used to form the housing 172. The housing 172 can also be formed from other material like plastics.

Folded corrugated cardboard has the advantage of being a particularly low-cost option. The thermally insulating housing 172 may also easily be removed by cutting adhesive strips that hold the housing 172 together. The cardboard may have a wax layer on the outside 174 or a thin plastic film is wrapped or a thin plastic tube is positioned to make this housing 172 be usable even when it is raining. The housing 172 may have latches being folded towards the inside to fix the rejacketing sleeve 102 firmly at a pre-defined position within the housing 172 or at least position it within certain limits. The housing 172 could also be formed to create contact pressure and thus a certain friction to position and fix the sleeve in the housing 172. This may work particularly well if elastomeric compression rings 140 are used. Another option is to adhesively bond the housing 172 to the substrate underneath.

Furthermore, in order to seal the housing 172 at either end, a textile or plastic cover film 176 may be provided. For instance, a polypropylene woven or non-woven fiber material may advantageously be arranged around the housing 172. Such a fiber material is mechanically robust and withstands elevated temperatures. The outer sleeve 102 with the thermally insulating housing and the cover 176 is delivered with folded-back end portions. The cable jointer unfolds and fixes the ends on the cable jackets 119, 121 with a fixing means 178, such as an adhesive tape or a rubber ring.

Another technically advantageous and cost reducing function of the housing 172 may be to deform at least the outer sleeve 102 to a certain extent. This may be helpful if sleeves are provided with a shape like shown in FIG. 19 and the housing is robust enough and designed with a shape and size that deforms the sleeve such that it becomes more round.

Figure 28:
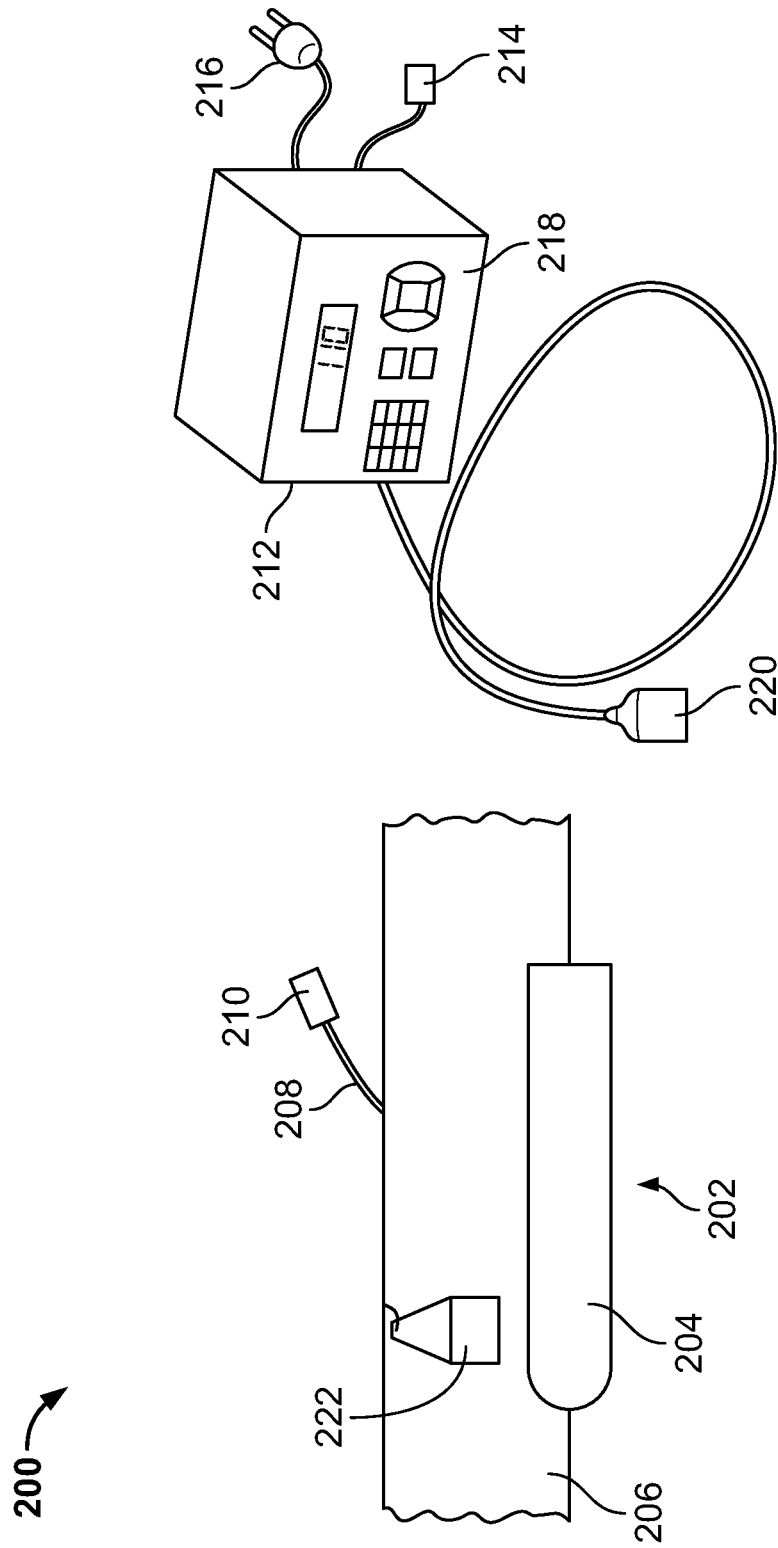
FIG. 28 schematically shows a perspective view of an installation system according to the present invention.

An installation system 200 for installing a heat shrink cover onto a component to be covered according to the method according to the present invention will be described in the following with reference to FIGS. 28 and 29. As shown in FIG. 28, an installation kit 202 comprises an inner sleeve 204 and an outer sleeve unit 206. The outer sleeve unit 206 has a heat shrink sleeve according to one of the embodiments described above covered with a electrical heating unit, and optionally a thermally insulating unit. The heating unit has at least one connector lead 208 with at least one plug connector 210.

For providing electrical energy to the heating unit, the installation system 200 has a control unit 212, as shown in FIG. 28. The heating unit is connected via the plug connector 210 to a mating connector 214. The control unit 212 may be connected by a power supply plug 216 either to the mains power supply or to a battery or the like. A control panel 218 having keys and a display, allows manual interaction of an operator. The control unit 212 advantageously may also be used to control the intensity of the heating and, in case the heating unit is equipped with heating zones that may be addressed separately, to control the sequence of the activated heating zones. It may also detect the actual (average) temperature of the heating unit to some extent by tracking voltage and/or current. The control unit 212 may also modify the process parameters such as voltage, current, and time periods depending on the measured or manually typed in data of the ambient temperature and/or of the heatshrink cover. The control unit 212 may also track the actual product and process parameters as well as GPS data for the jointing location or may for instance store the identity of the installer or the cables.

In order to recognize the particular outer sleeve unit 206, the control unit 212 further comprises an identification reader, for instance a bar code or QR code reader 220 as shown in FIG. 28. The outer sleeve unit 206 is equipped with a QR code tag 222 (or any other suitable identification means) for identifying the type and structure of the outer sleeve unit 206 by the reader 220.

An operator first reads the identification tag 222 of the installation kit 202. Next, the inner sleeve 204 is arranged in the desired location over the component to be covered. Then the shield connection is done. The outer sleeve unit 206 is now arranged to cover the inner sleeve 204 and the connector 210 is connected to the mating connector 214. The control unit 212 is connected to a power source via power plug 216. The operator may now input the required commands for starting the heating program that belongs to the registered identification of the identification tag 222, or uses the heating program which data may be contained in the identification tag 222 which may require to use a QR code instead of a barcode.

After completion of the heating program, the component to be covered is surrounded by a heat shrink inner sleeve 204 and a heat shrink outer sleeve. According to the present invention, the heating system, an optional pressing device, and an optional thermally insulating unit are removed and discarded. Advantageously, no torch is required and the details of the heating sequence are controlled by a program stored in the control unit 212 or the data is contained in the identification tag 222.

Figure 29:
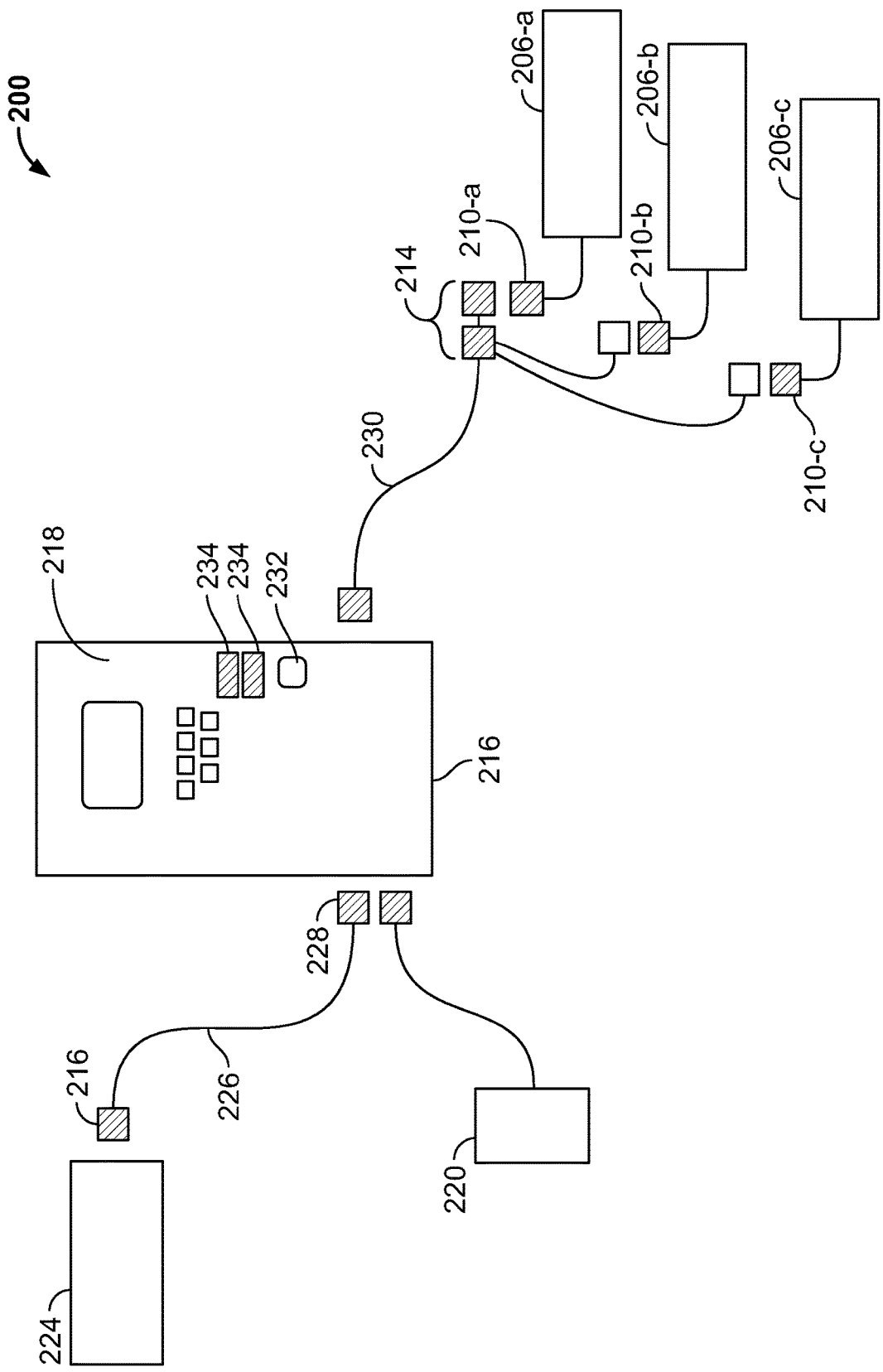
FIG. 29 is a block diagram of an installation system according to the present invention.

FIG. 29 illustrates the installation system 200 according to the present invention as a schematic block diagram. According to this particular embodiment, the control unit is connected to a power source 224 by the power connector 216 which may be part of a power cable 226. The power connection 228 may either be pluggable or fixed. The power source 224 may provide a voltage of 230 V, 110 V, 24 V or may be any other suitable power source. In an embodiment, the heating unit is supplied with a low-voltage via a low-voltage cable 230.

In FIG. 29, two possible solutions are illustrated for realizing the mating connector 214 at the low-voltage cable 230. Firstly, the mating connector 214 may be designed to directly match with the connector 210-a of the outer sleeve unit 206-a. Furthermore, the connector 214 may also be designed to branch off into several connectors that may be attached to two or more plug connectors 210-b, 210-c. In an embodiment, the control unit 216 may be operable to control the shrinking of more than one outer sleeve unit 206-a to 206-c at the same time.

Furthermore, the identification reader 220 may also be connected to the control unit 218 in a pluggable manner, so that it may be exchanged easily. Furthermore, the installation process may of course also be controlled without using an identification by directly communicating with the control unit 216. It goes without saying that also a wireless communication may be provided for remotely communicating with the control unit 216. Moreover, one or more communication ports, such as USB ports 234 may be provided. An emergency switch 232 may be provided for overriding the control program and switch off the heating if needed.

Finally, it has to be noted that any values or specific characteristics of the described electric and electronic components are only intended as examples and may of course be varied as necessary in order to adapt the circuitry to the particular needs of a specific application environment. Furthermore, although the embodiments have been described in relation to particular examples, the invention is not limited and numerous alterations to the disclosed embodiments can be made without departing from the scope of this invention. The various embodiments and examples are thus not intended to be limited to the particular forms disclosed. Rather, they include modifications and alternatives falling within the scope of the claims and individual features can be freely combined with each other to obtain further embodiments or examples according to the invention.

What is claimed is:

1. An installation kit for installing a heat shrink cover onto a component, comprising:
   the heat shrink cover having an inner sleeve and an outer sleeve, the inner sleeve and the outer sleeve are arranged around the component and the outer sleeve at least partially encompasses the inner sleeve, the inner sleeve and the outer sleeve are separate independent parts that are each formed of a heat recoverable material, an outer surface of the inner sleeve has a first metal film disposed directly on and at least partially covering the outer surface of the inner sleeve, the first metal film is positioned between the inner sleeve and the outer sleeve; and
   an electrical heating system attached to an outer surface of the outer sleeve, the electrical heating system is electrically energizable to provide heat for heat-recovering the inner sleeve, the electrical heating system is releasably fixed at the outer sleeve and is removable after completion of heat recovery.

2. The installation kit of claim 1, wherein an inner surface of the outer sleeve is at least partially covered by a second metal film disposed directly on the inner surface of the outer sleeve, the second metal film is positioned between the inner sleeve and the outer sleeve and faces the first metal film.

3. The installation kit of claim 1, further comprising a thermally insulating unit at least partly covering the electrical heating system.

4. The installation kit of claim 3, wherein the thermally insulating unit has a pouch filled with a plurality of thermally insulating parts.

5. The installation kit of claim 1, wherein the electrical heating system has a plurality of heating elements operable to heat a plurality of different regions of the inner sleeve and the outer sleeve along a longitudinal axis of the inner sleeve and the outer sleeve.

6. The installation kit of claim 5, wherein the plurality of heating elements heat the plurality of different regions at different times.

7. The installation kit of claim 1, further comprising a pressure device exerting radial pressure onto the electrical heating system.

8. The installation kit of claim 7, wherein the pressure device has a plurality of elastic rings and/or an elastomeric band and/or a plurality of heatshrink rings.

9. The installation kit of claim 1, wherein at least one of the inner sleeve and the outer sleeve has a support element and/or a flange.

10. An installation system, comprising:
    an installation kit including a heat shrink cover and an electrical heating system, the heat shrink cover having an inner sleeve and an outer sleeve, the inner sleeve and the outer sleeve are arranged around a component and the outer sleeve at least partially encompasses the inner sleeve, the inner sleeve and the outer sleeve are separate independent parts that are each formed of a heat recoverable material, an outer surface of the inner sleeve has a first metal film disposed directly on and at least partially covering the outer surface of the inner sleeve, the first metal film is positioned between the inner sleeve and the outer sleeve, the electrical heating system is attached to an outer surface of the outer sleeve; and
    a control unit energizing the electrical heating system to provide heat for heat-recovering the inner sleeve, the electrical heating system is releasably fixed at the outer sleeve and is removable after completion of heat recovery.

11. The installation kit of claim 1, wherein the inner sleeve is not in thermal contact with the outer sleeve prior to the heat recovery.

12. The installation kit of claim 7, wherein the pressure device exerts radial pressure onto the electrical heating system throughout heat recovery.

13. The installation kit of claim 12, wherein the pressure device has a plurality of elastic rings separate from one another and spaced along the electrical heating system.

14. The installation kit of claim 13, further comprising a plurality of layers of an intermediate film between the elastic rings and the electrical heating system.

15. The installation kit of claim 13, further comprising an elastic intermediate layer between the elastic rings and the electrical heating system.

16. The installation kit of claim 15, wherein the elastic intermediate layer is a silicone foam.

17. The installation kit of claim 13, further comprising a plurality of support stripes between the elastic rings and the electrical heating system, the support stripes are oriented along an axial direction of the heat shrink cover.

18. The installation kit of claim 17, wherein the support stripes are a metal material or a cardboard material.

19. The installation kit of claim 13, wherein a spacing between the rings differs along a length of the heat shrink cover, the rings are closer together at a center of the heat shrink cover than at a pair of ends of the heat shrink cover.

20. The installation kit of claim 19, wherein the rings at the center of the heat shrink cover have a width that is less than a width of the rings at the pair of ends of the heat shrink cover.

* * * * *